Feb. 19, 1957

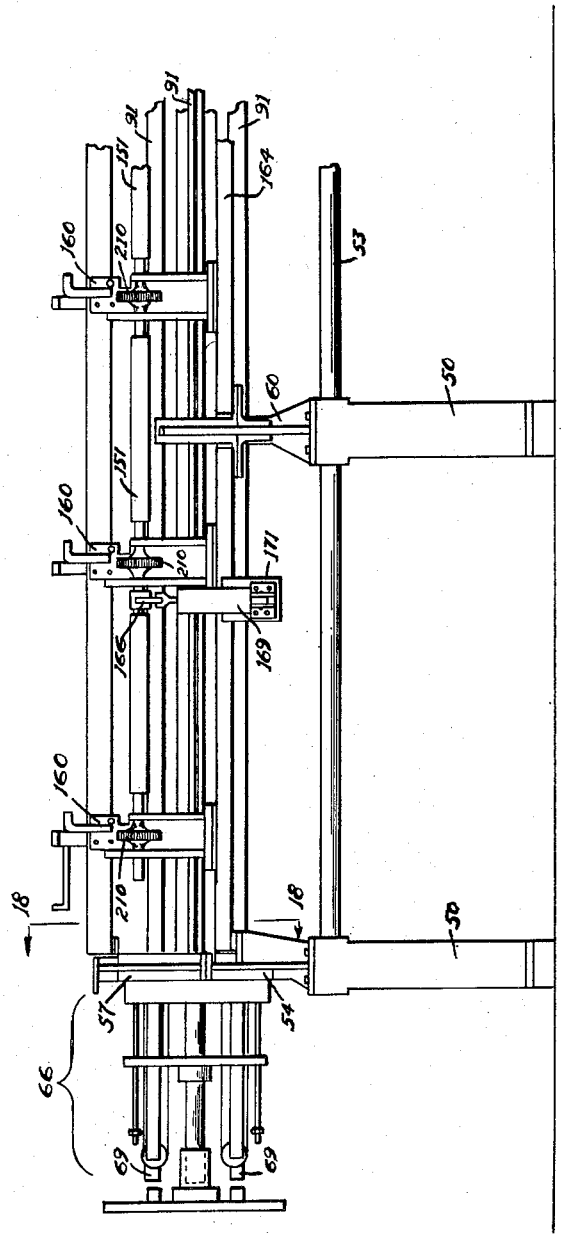

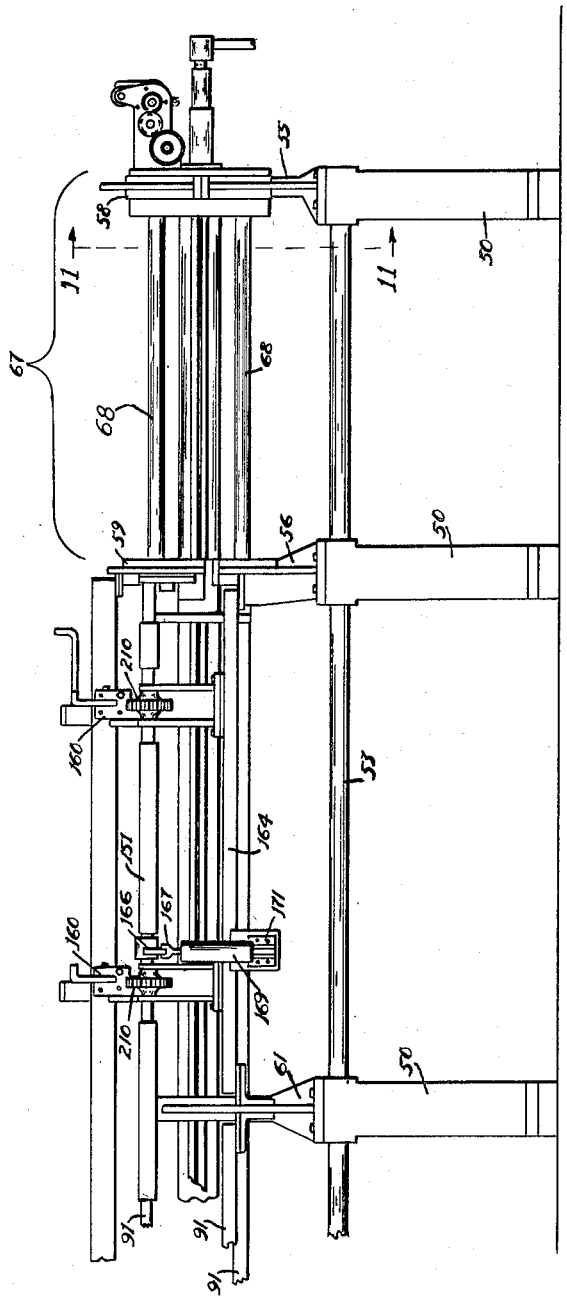

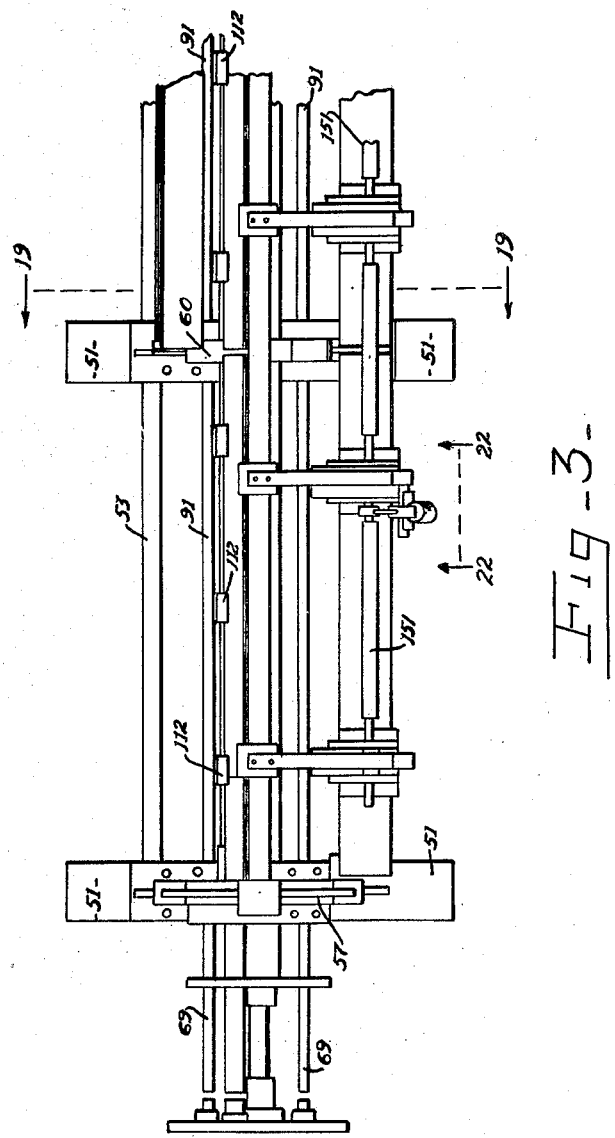

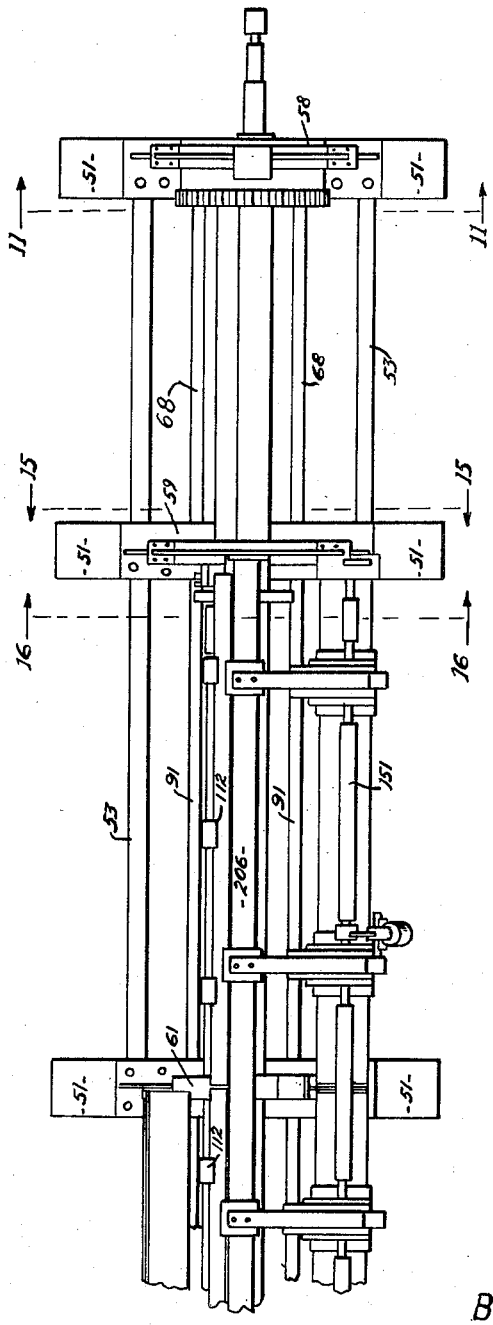

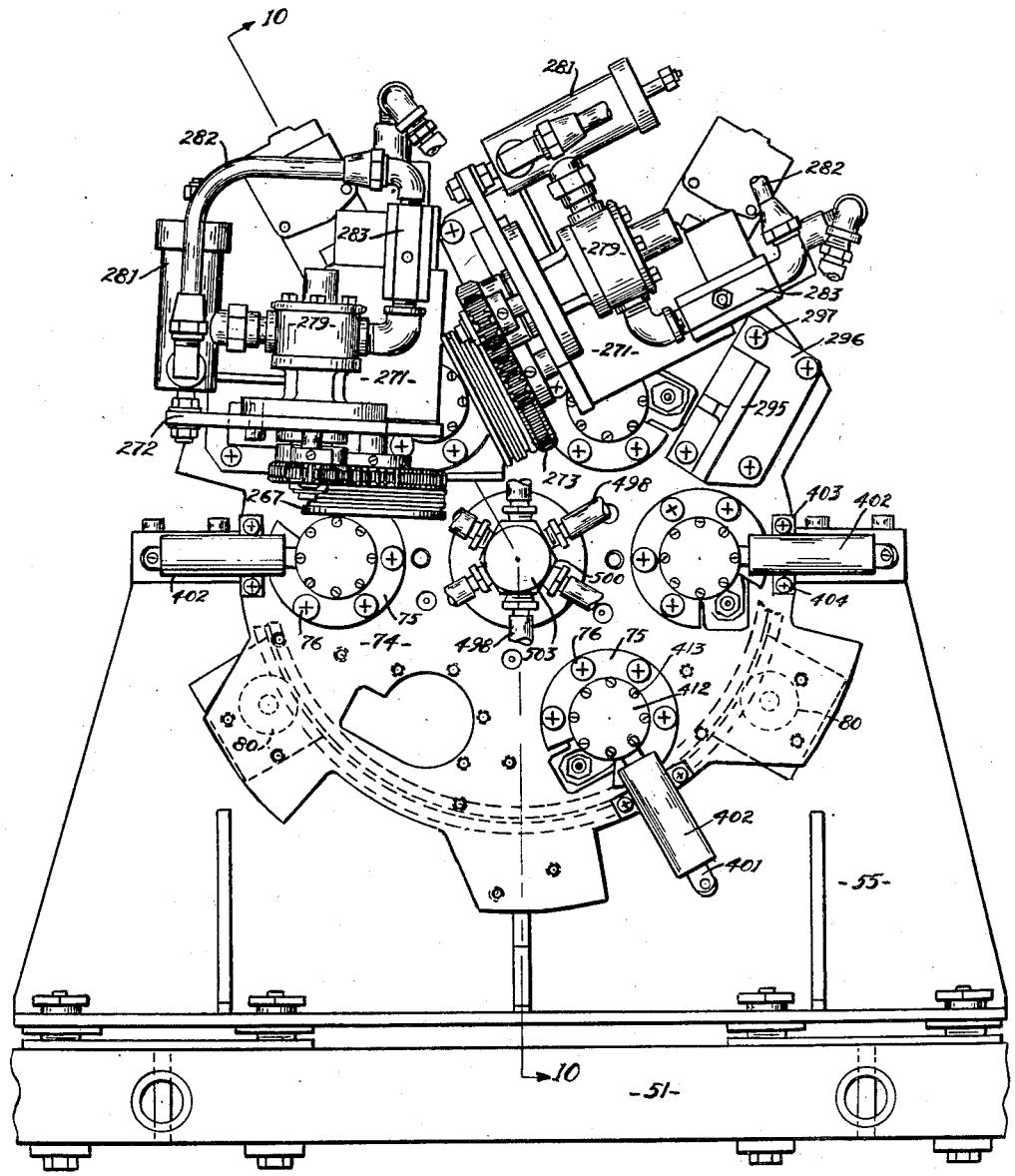
Fig-5-

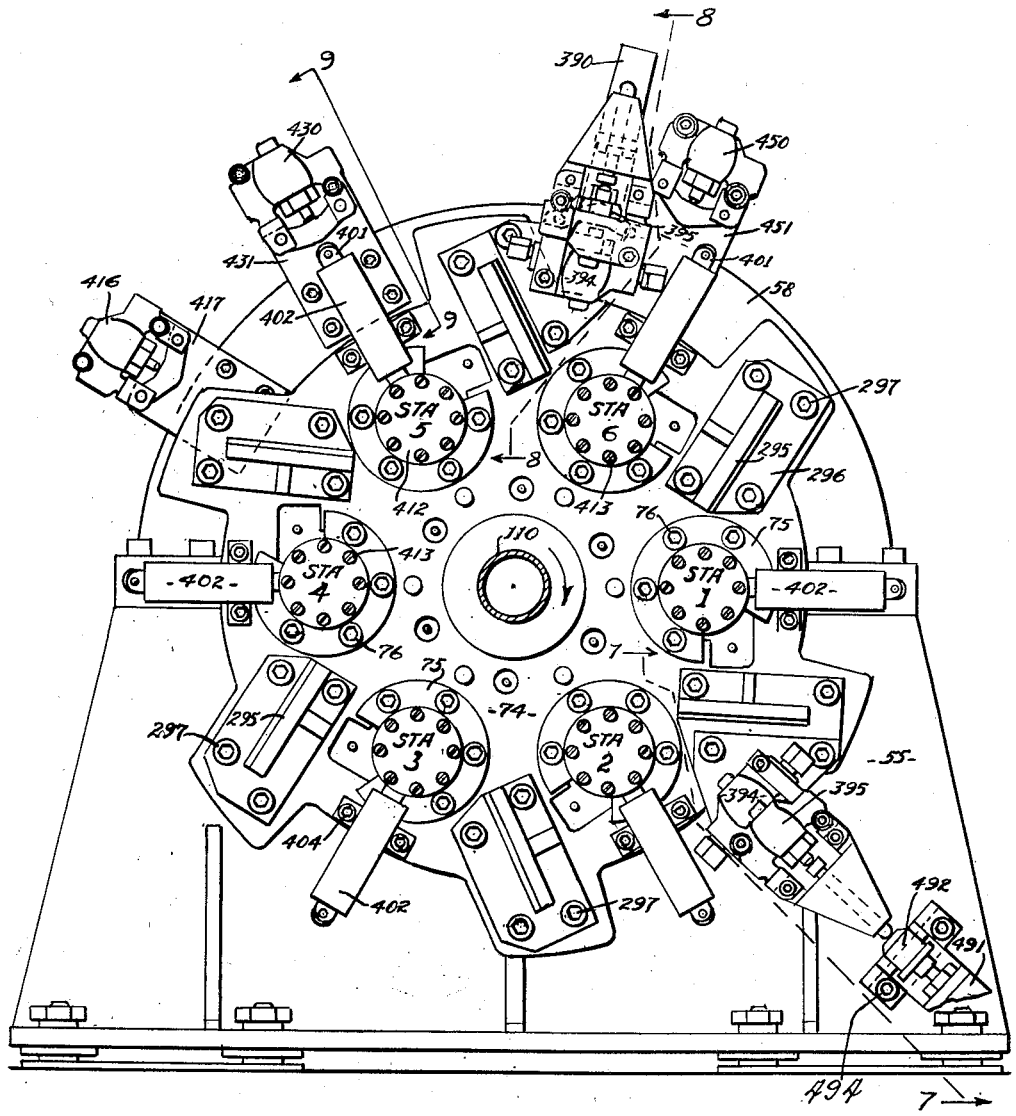

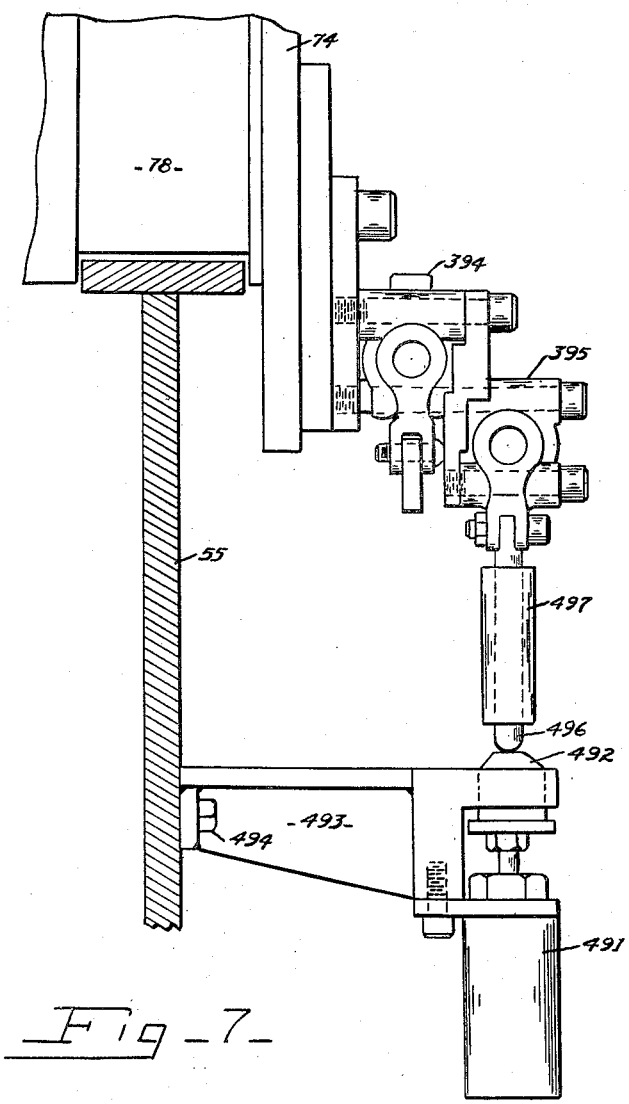

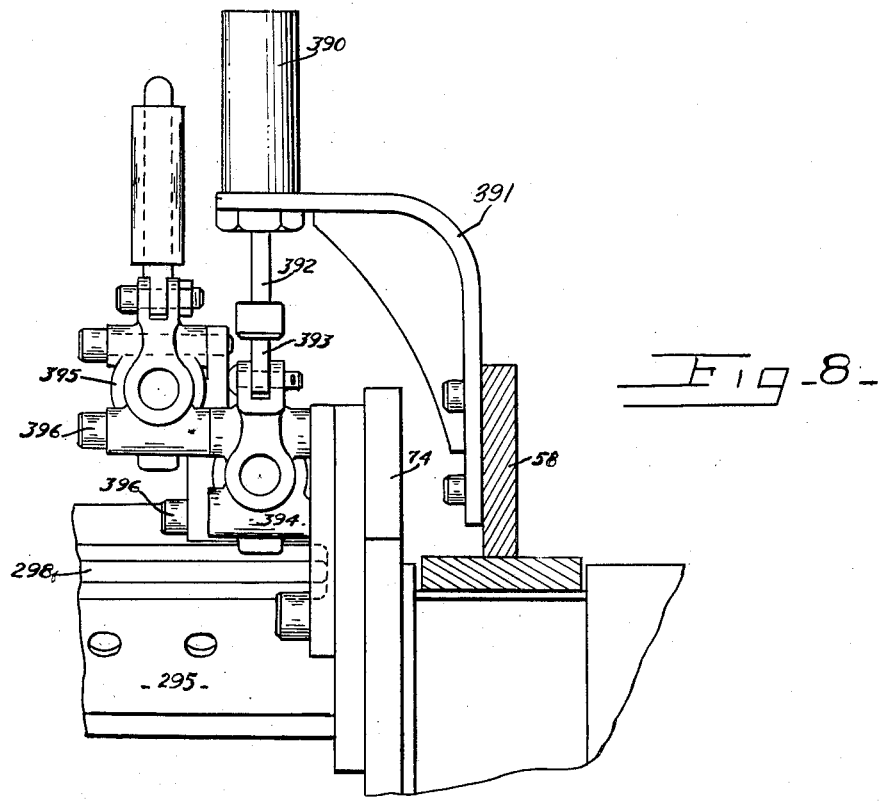
Fig-8-
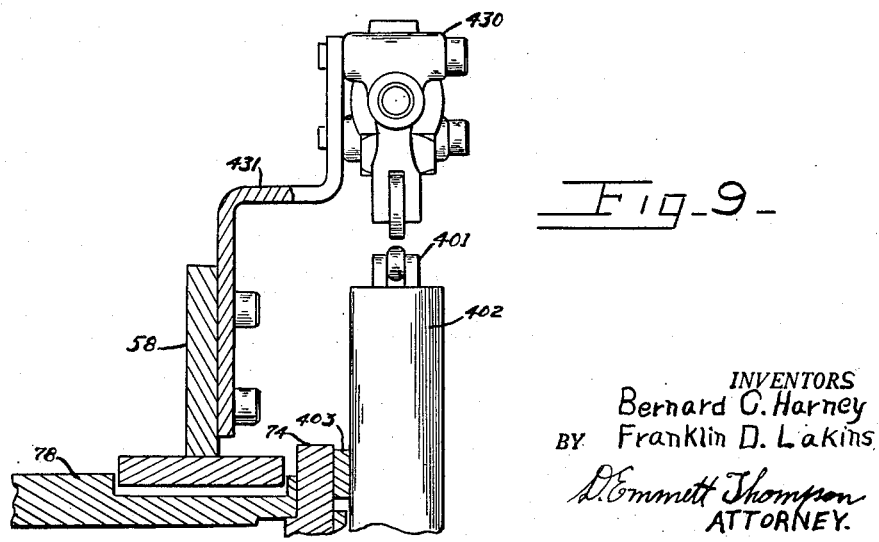
Fig-9-
INVENTORS
Bernard C. Harney
BY Franklin D. Lakins
D. Emmett Thompson
ATTORNEY.

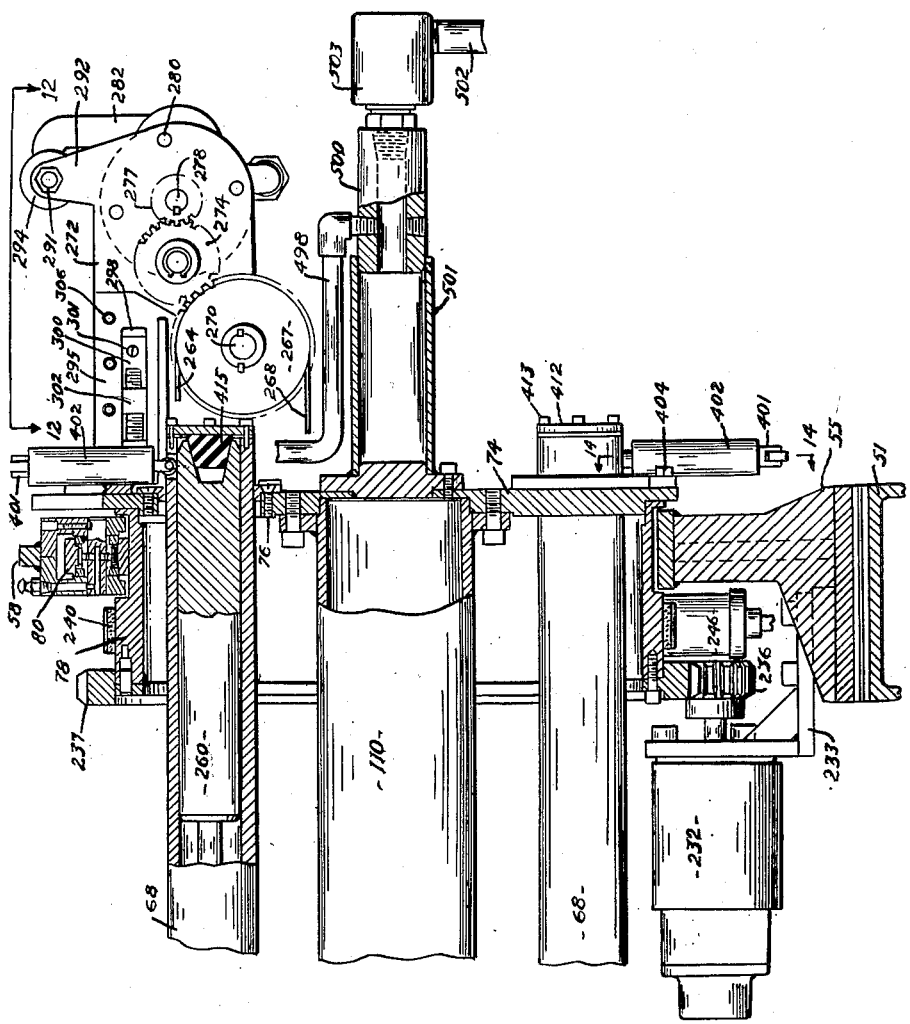

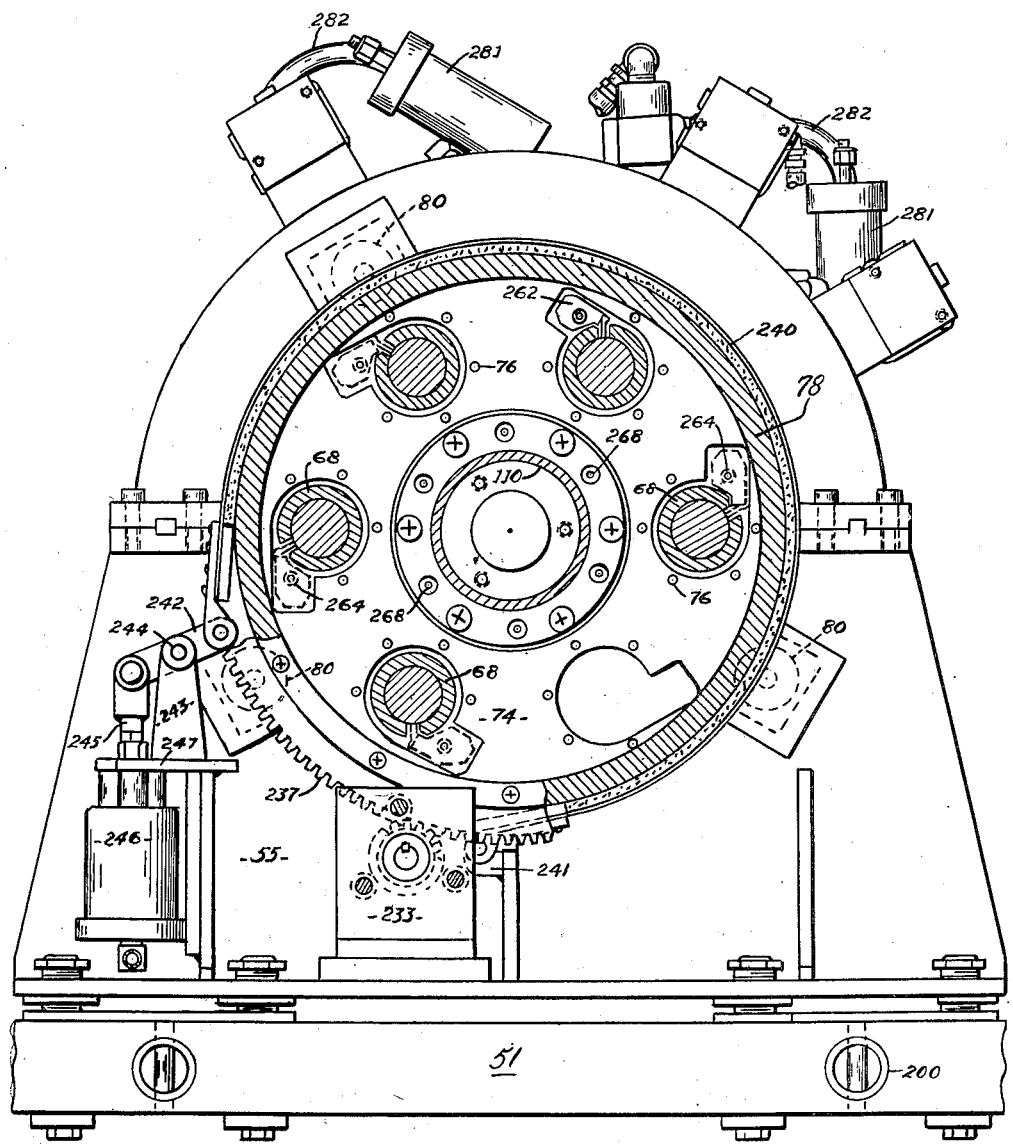

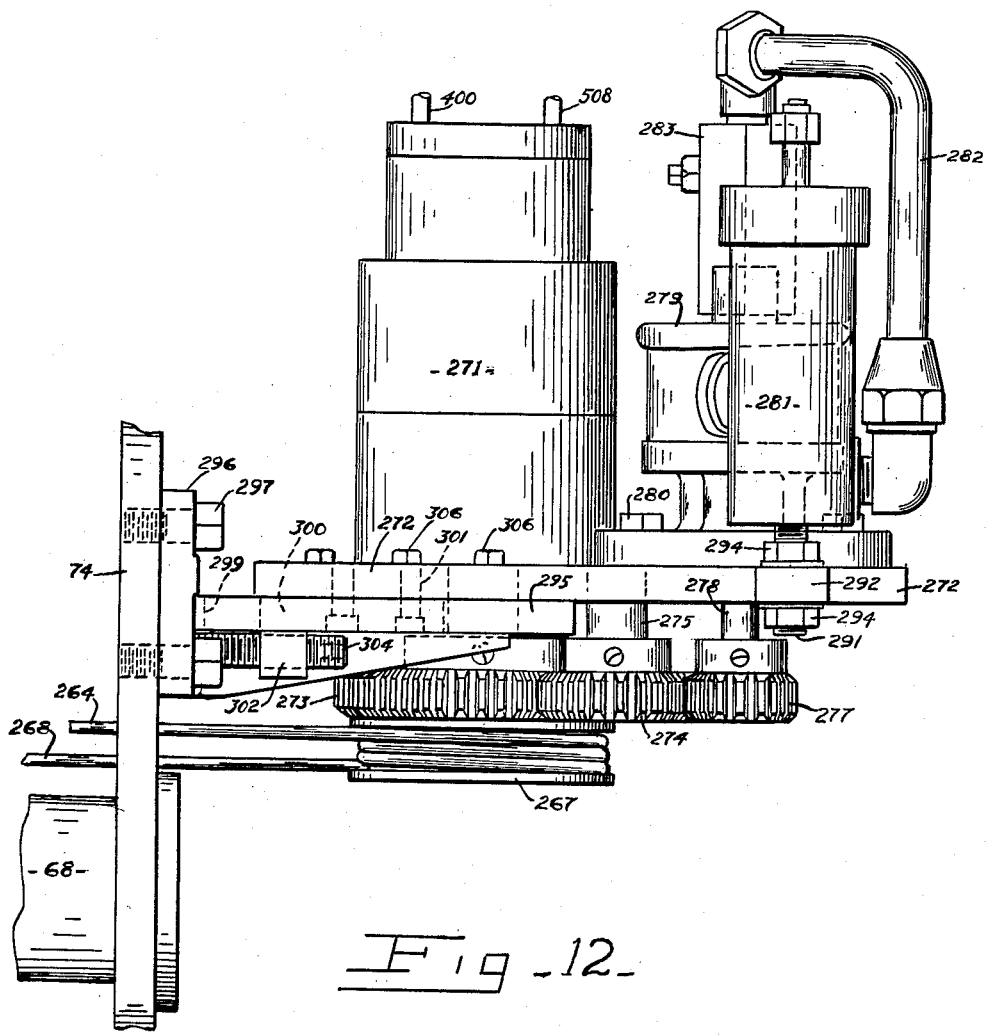

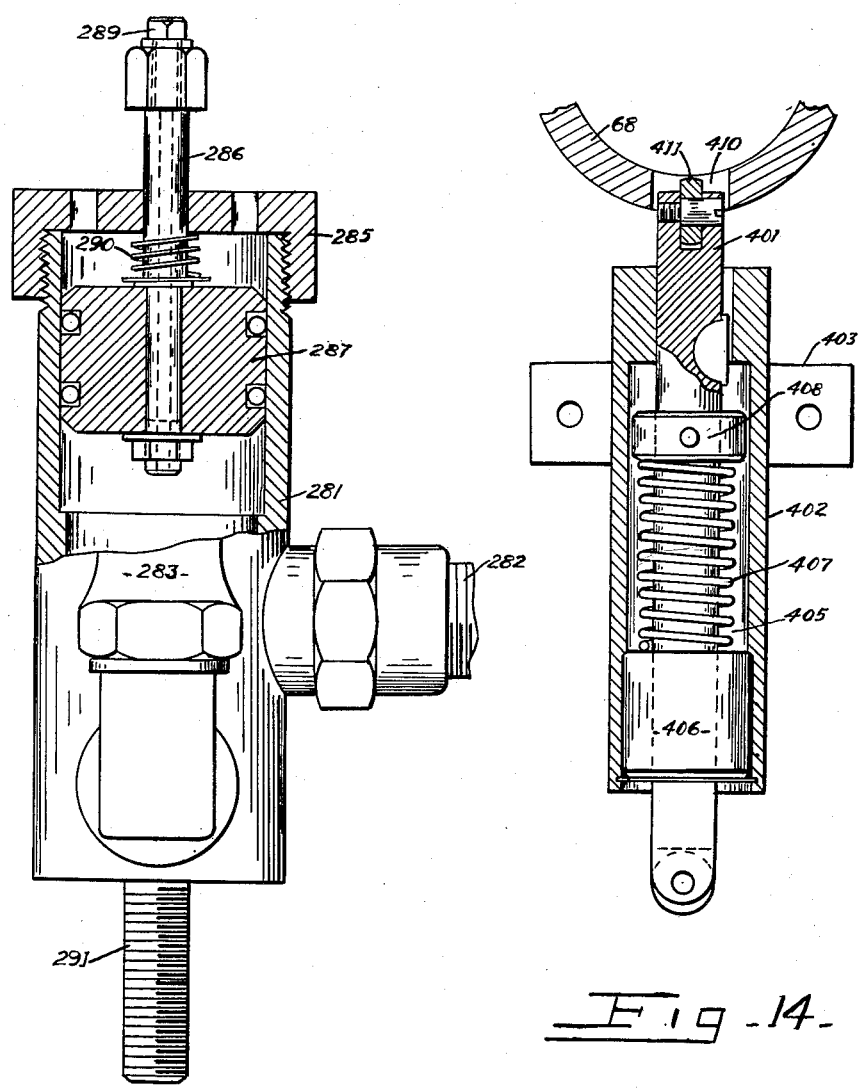

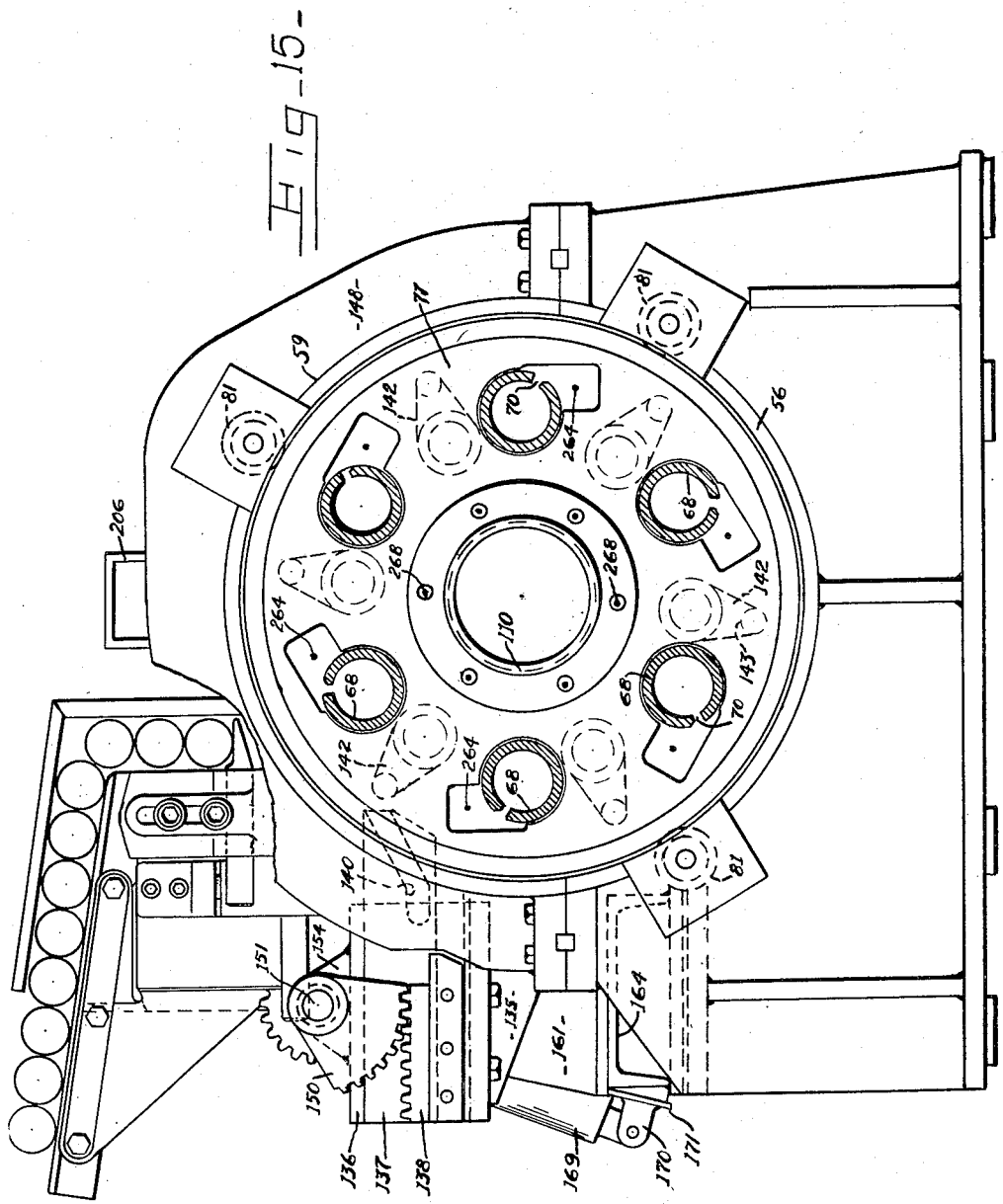

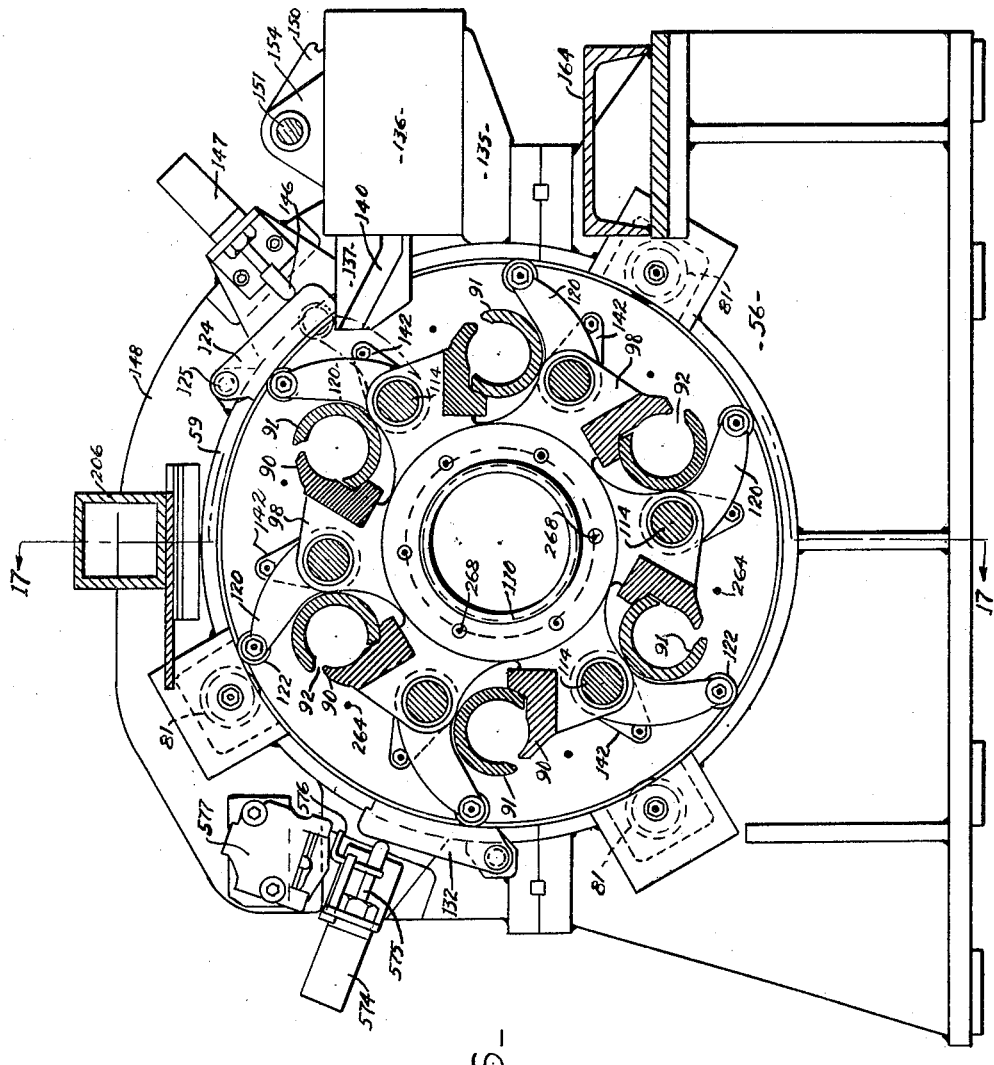

B. C. HARNEY ET AL 2,781,574

AUTOMATIC BAR FEED FOR MULTIPLE
SPINDLE BAR WORKING MACHINES

Filed Sept. 6, 1955

INVENTORS
Bernard C. Harney
BY Franklin D. Lakins

D. Emmett Thompson
ATTORNEY

Fig-19

Fig_20_

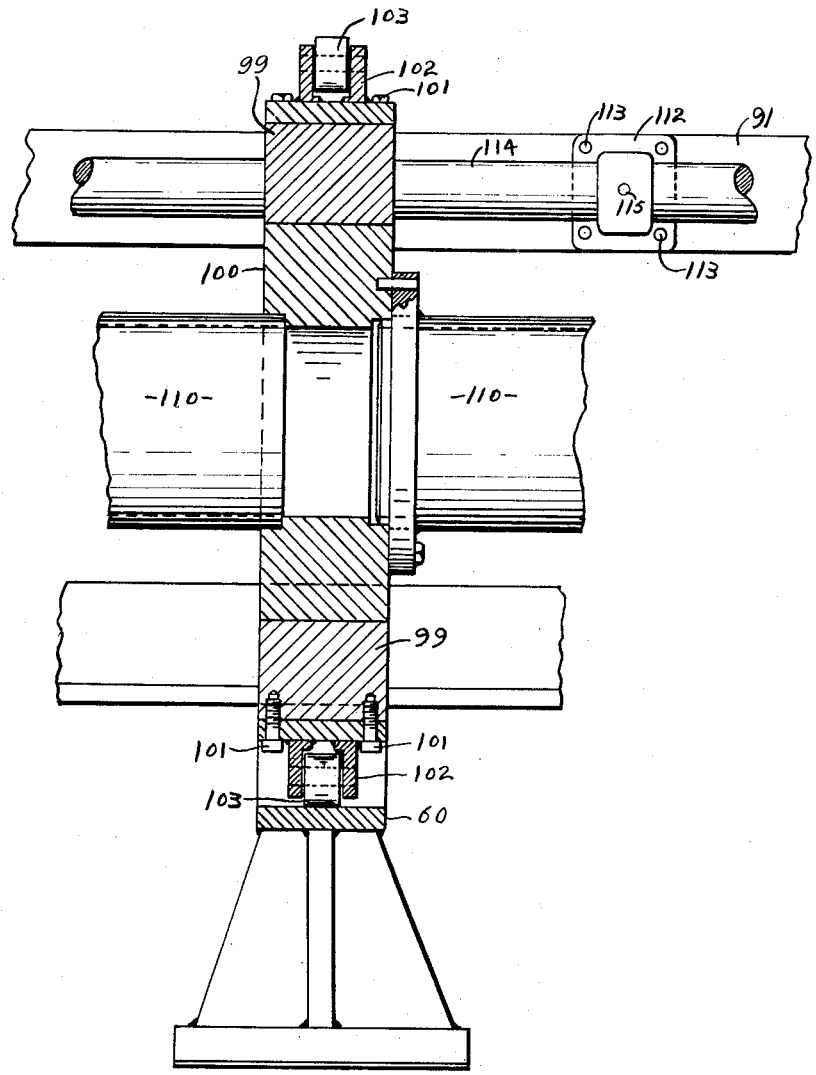

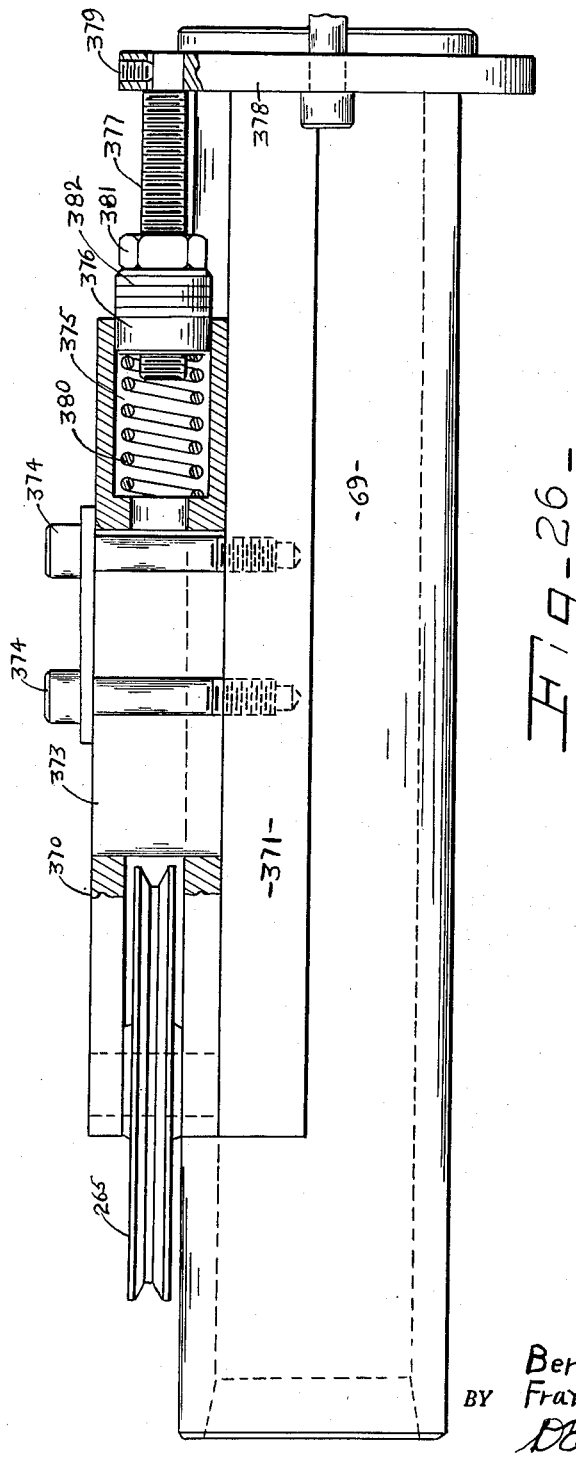

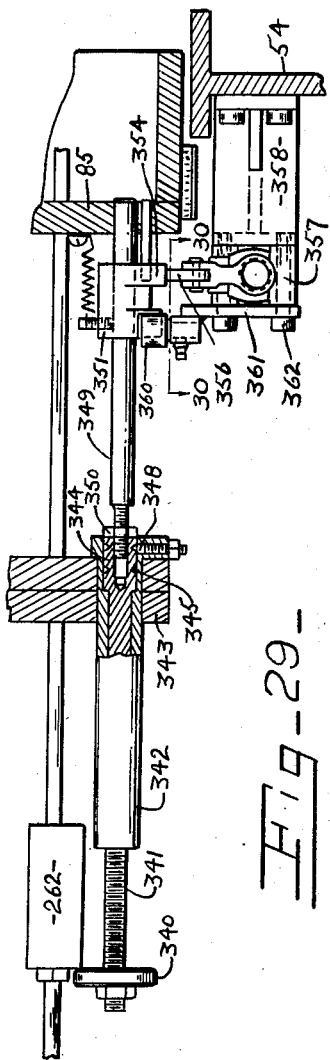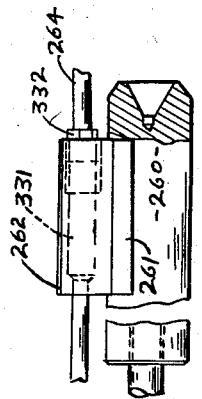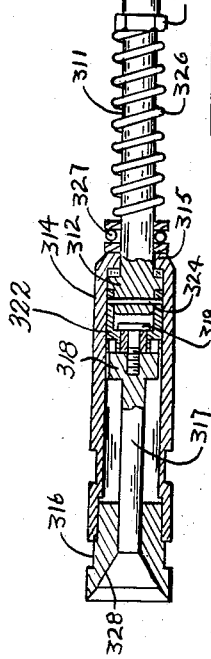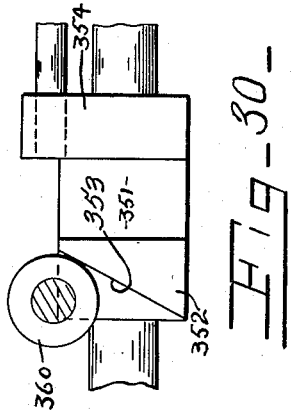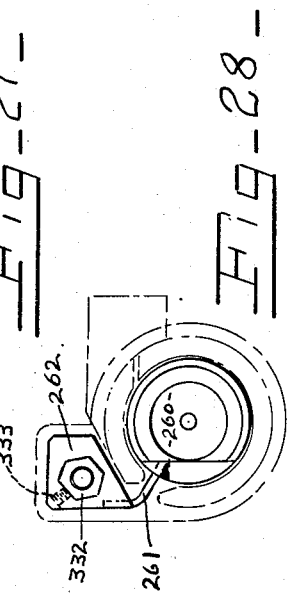
INVENTOR.
Bernard C. Harney
Franklin D. Lakins
BY Emmett Thompson
ATTORNEY.

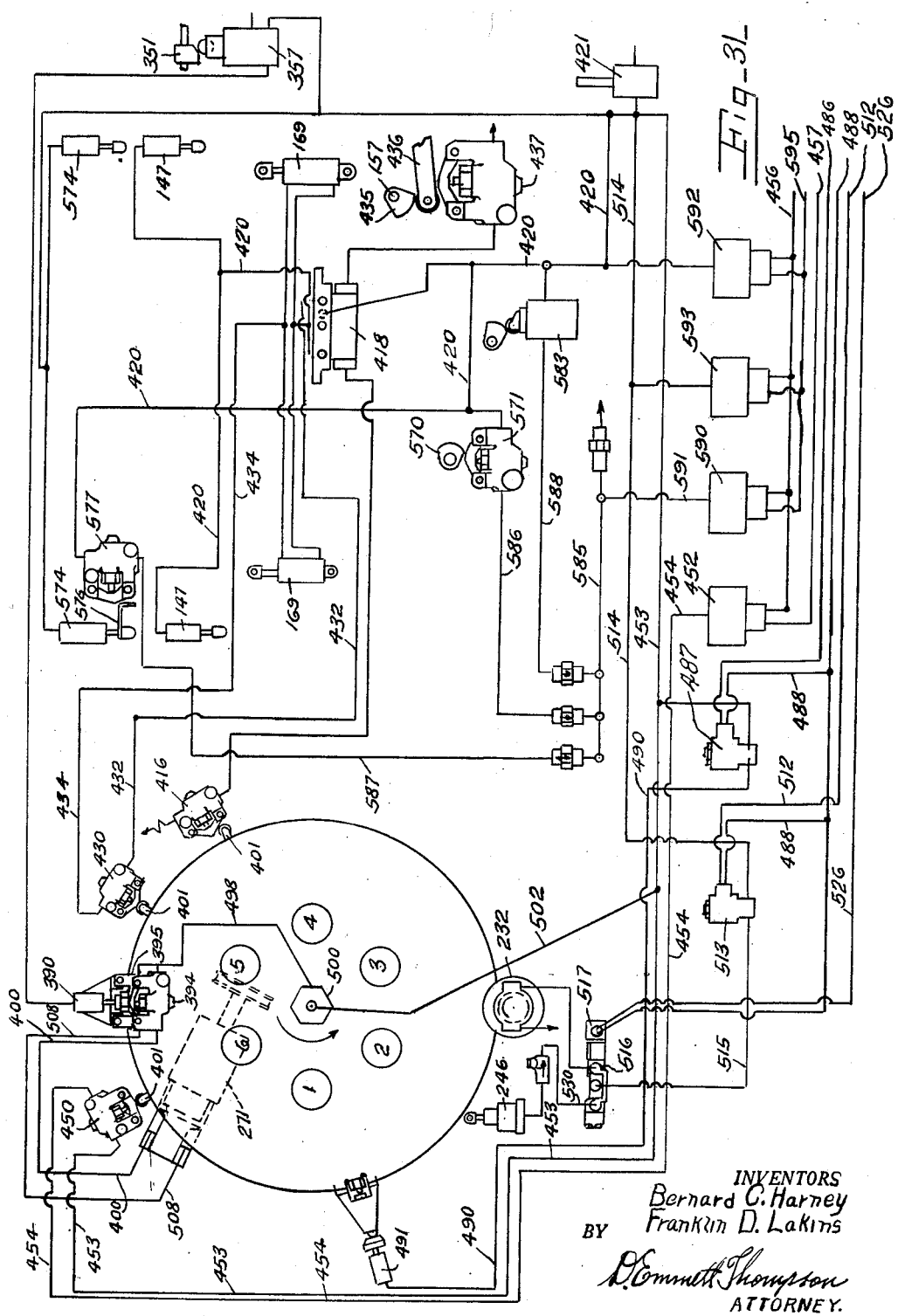

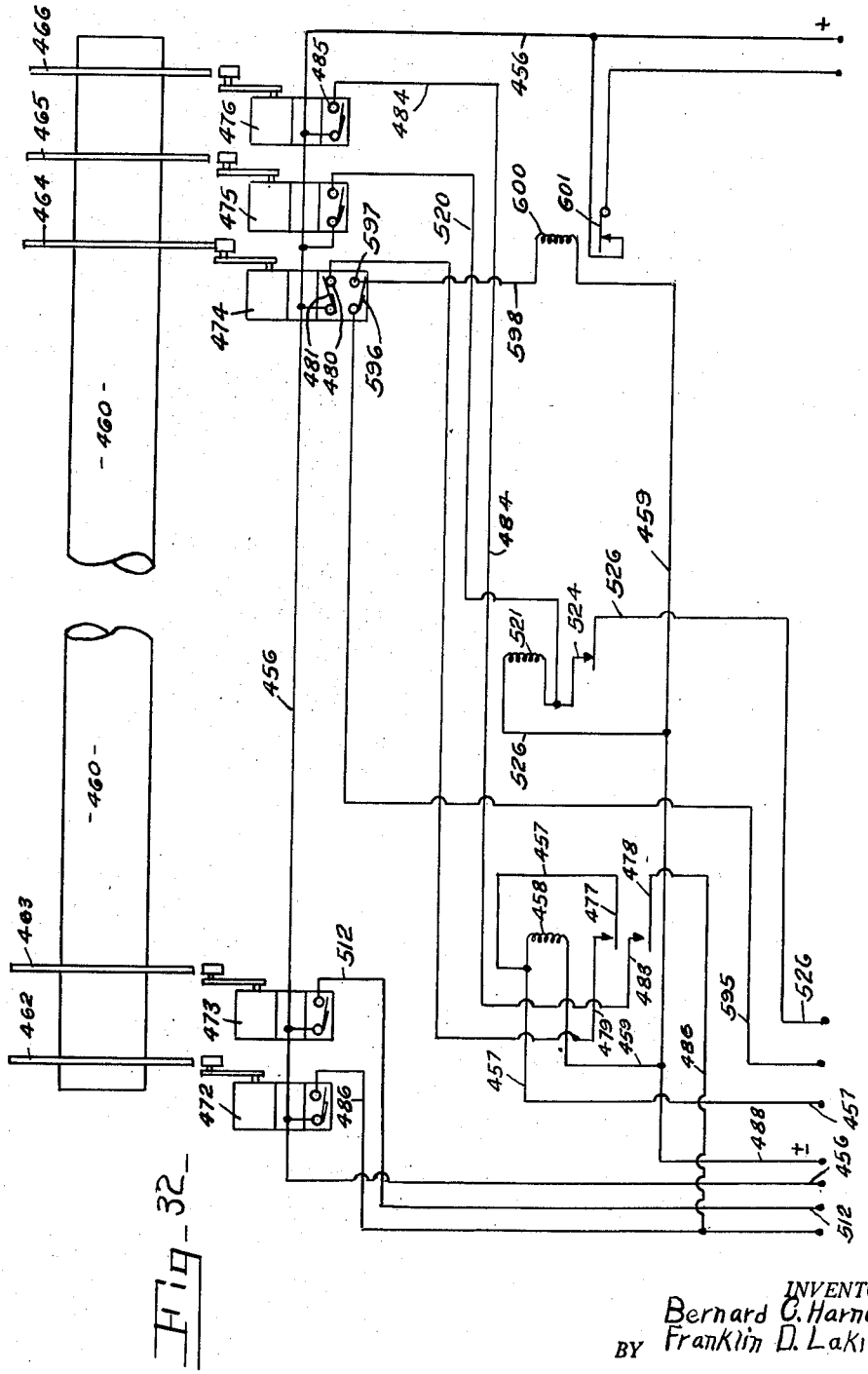

United States Patent Office 2,781,574
Patented Feb. 19, 1957

2,781,574
AUTOMATIC BAR FEED FOR MULTIPLE SPINDLE BAR WORKING MACHINES

Bernard C. Harney, Syracuse, and Franklin D. Lakins, Nedrow, N. Y., assignors to Lipe-Rollway Corporation, Syracuse, N. Y., a corporation of New York Application September 6, 1955, Serial No. 532,690

11 Claims. (Cl. 29—93)

This invention relates to automatic stock bar feed structure for automatic multiple spindle bar working machines which have a rotatable work spindle carrier in which the spindles are journalled. At the present time, fully automatic stock bar feeds are available for use with single spindle bar working machines. A form of single spindle bar feed is illustrated in Patent No. 2,595,522, issued May 6, 1952, to B. C. Harney.

This invention has as an object an automatic stock bar feed structure embodying a circular arrangement of stock bar guides positioned in alinement with the spindles of the bar working machine respectively, and having loading means operable to automatically load the bar guides with stock bars from a supply magazine, and to feed the stock bars lengthwise of the guide members through the spindles of the machine, until the bars are used up, and to then automatically replenish each guide with a new stock bar, the operation of the feed structure being entirely automatic.

The invention consists in the novel features and in the combinations and constructions hereinafter set forth and claimed.

In describing this invention, reference is had to the accompanying drawings in which like characters designate corresponding parts in all the views.

In the drawings:

Figure 1 is a side elevational view illustrative of the structural arrangement of the front portion of an automatic stock bar feed embodying our invention.

Figure 2 is a view, similar to Figure 1, of the rear portion of the feed structure.

Figure 3 is a top plan view of the front portion of the general structural arrangement shown in Figure 1.

Figure 4 is a top plan view of the rear portion shown in Figure 3.

Figure 5 is an elevational view of the rear end of the bar feed structure looking to the left, Figures 2 and 4, with four of the feed motors and other parts removed.

Figure 6 is a view, similar to Figure 5, with all feed motors removed, the view showing the arrangement of the control valves mounted on the rear end of the feed structure.

Figure 7 is a view taken on line 7—7, Figure 6.

Figure 8 is a view taken on line 8—8, Figure 6.

Figure 9 is a view taken on line 9—9, Figure 6.

Figure 10 is a sectional view of the rear end portion of the bar feed taken on line 10—10, Figure 5, the view showing the mounting of one of the feed motors.

Figure 11 is a view taken on line 11—11, Figure 2.

Figure 12 is a view looking radially inwardly on one of the feed motor units, as indicated by the line 12—12, Figure 10.

Figure 13 is an elevational view, partly in section, of an oil cylinder in the pump circuit of one of the feed motor units.

Figure 14 is a sectional view of one of the actuators for operating the valve controlling the bar loading mechanism, the view being indicated by the line 14—14, Figure 10.

Figure 15 is a view taken on line 15—15, Figure 4.

Figure 16 is a view taken on line 16—16, Figure 4.

Figure 19 is a sectional view taken on line 19—19, Figure 3.

Figure 25 is a sectional view of the structure shown in Figure 19, the view being taken on line 25—25 of that figure.

Figure 26 is an enlarged view of the front end portion of one of the bar guides including the cable tensioning device with parts in section.

Figure 27 is a view, partly in section, of one of the bar pushers.

Figure 28 is an end view looking to the left, Figure 27.

Figure 29 is a view showing the arrangement of the reverse valve actuating mechanism.

Figure 30 is a view taken on line 30—30, Figure 29.

Figure 31 is a diagrammatic view of a portion of the fluid and electrical operating control circuits.

Figure 32 is a diagrammatic view of the remainder of the electrical control circuit associated with the bar working machine.

Figure 17:
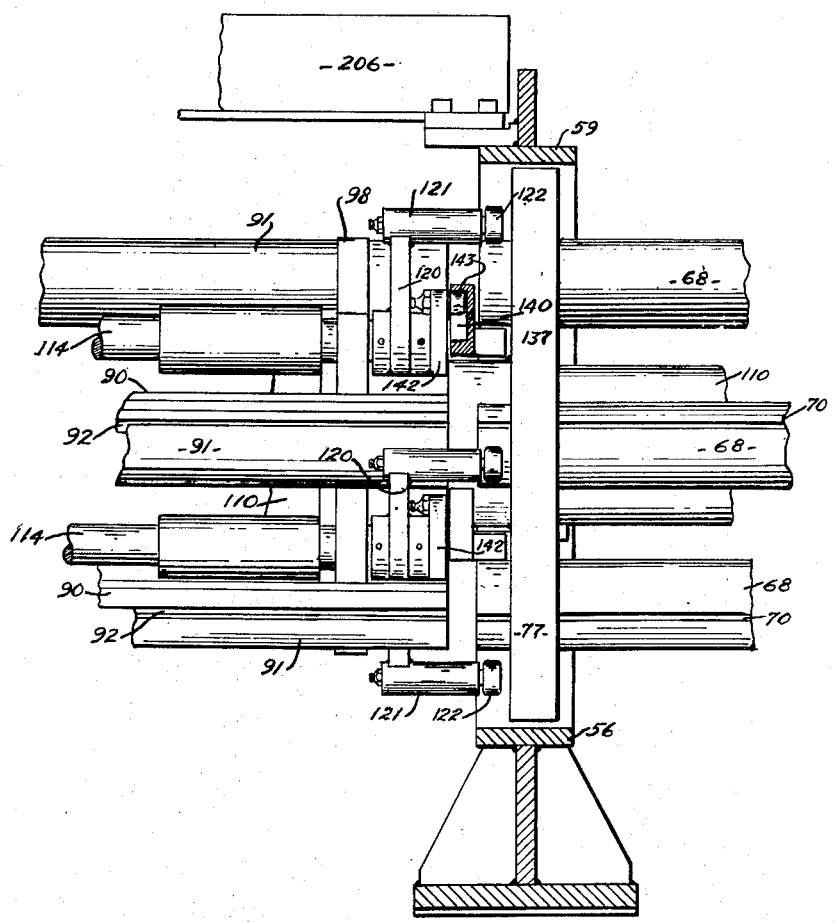
Figure 17 is a view, looking to the left, Figure 16, with the right side of the bearing structure, or steady rest, removed.

The stock bar feed structure consists of a frame having a series of leg members 50. These leg members being arranged in pairs and being connected at their upper ends to cross members 51. The leg members 50 are tied together by rods 53 extending lengthwise of the machine and being secured in the cross members 51. The general arrangement of the structure is shown in Figures 1 to 4. Bearing members, or steady rests, 54, 55, are mounted on the front and rear ends of the frame, and also a steady rest 56 is mounted on the frame at the rear portion thereof in spaced relation forwardly of the rear end steady rest 55. These steady rests are provided with top portions or caps 57, 58 and 59, respectively, the steady rests being formed with a circular bore to receive the bar guide supporting members.

Intermediate the forward steady rest 54 and steady rest 56, there is positioned on the frame additional steady rests, as 60, 61. These intermediate steady rests 60, 61, are not provided with cap members but are of substantially semi-circular formation, see Figure 19.

The steady rests are employed to rotatably support a circular series of bar guides, there being one bar guide for each spindle of the bar working machine, and the bar guides are maintained respectively in axial alinement with the spindles of the machine. The bar guides are formed in three sections—a forward section 66, Figure 1, extending forwardly from the steady rest 54, a rear or breech section 67, Figure 2, extending between the steady rests 55, 56, and an intermediate section extending between the steady rests 54, 56, this intermediate section being of sufficient length to permit stock bars of appreciable length to be loaded into the guides in sidewise manner from a supply magazine.

In the arrangement shown, the stock bar guides in the forward and rear sections 66, 67, consist of tubular members—those in the breech section being designated 68, and those in the forward section being designated 69. The tubular members 68, 69, are formed with a lengthwise extending slot 70.

The rear ends of the tubes 68 in the breech section are fixedly mounted in a disk 74, the tubes being provided with circular flanges 75 secured to the disk, as by screws 76, see Figures 5, 6 and 10. The forward ends of the tube 68 of the breech section are fixedly mounted in a disk 77, Figures 15 and 17. The rear disk 74 has affixed to it a cylindrical portion 78, Figure 10, mounted in the circular bore of the steady rest 55 and its cap member 58. The steady rest is provided with three anti-friction rollers 80, see Figures 10 and 11, for rotatably supporting the cylindrical part 78. The steady rest 56, 59, is provided with similar rollers 81, see Figure 15.

Figure 21:
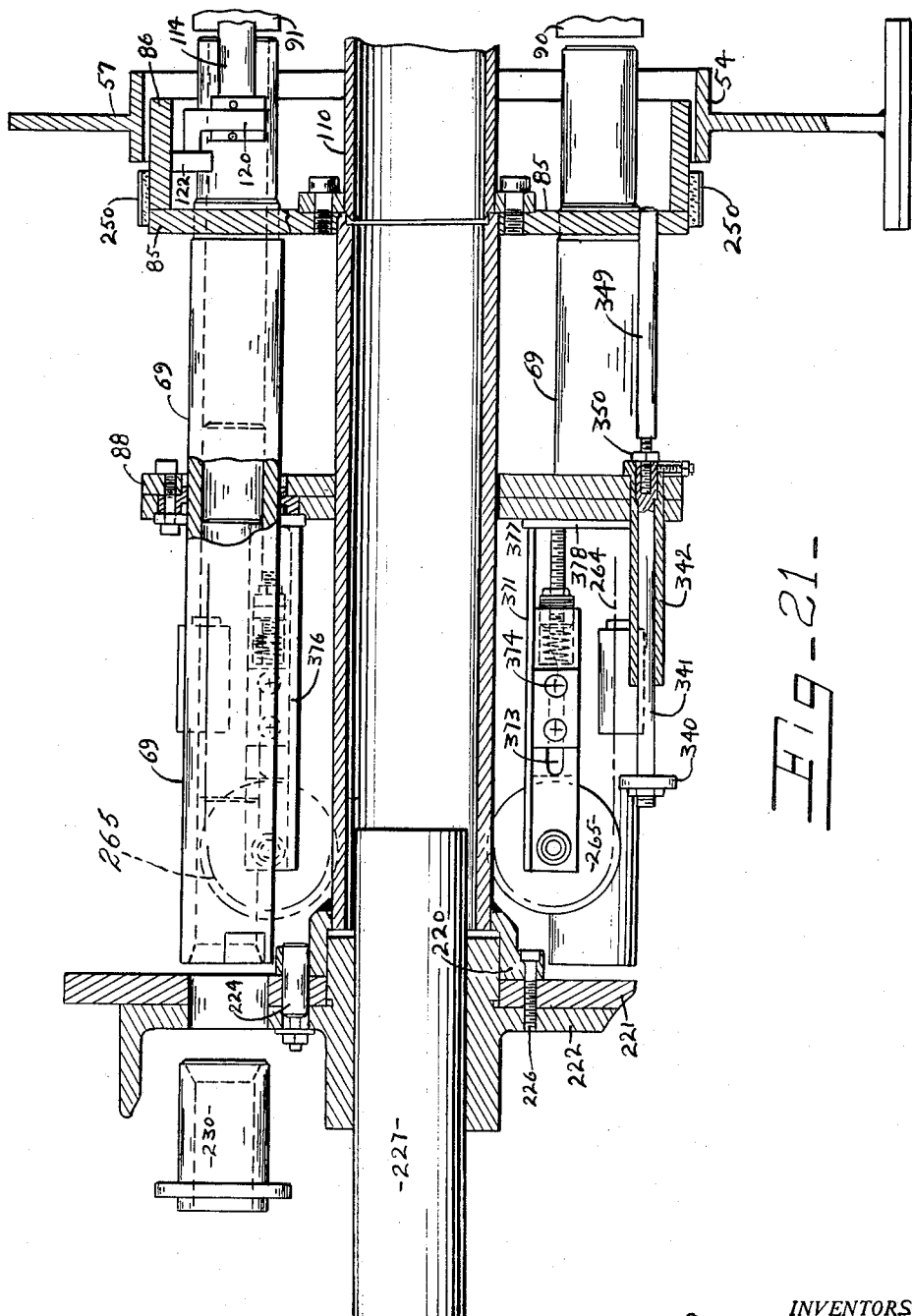
Figure 21 is a view of the front end portion of the machine indicated by the line 21—21, Figure 20.

The tubes 69 are secured at their rear ends in a disk 85, Figure 21, having a cylindrical portion 86 journalled in the forward steady rest 54, 57, and supported by rollers 87. The tubes 69 are also fixed in a disk 88.

The bar guides, in the intermediate portion of the machine, consist of a fixed portion or section 90, and a movable section 91. The movable sections 91 are in the form of tubular members having a portion of their side wall removed through an arc of approximately 90°. These movable sections are normally arranged in confronting relation and in proximity to the fixed sections 90, whereby the latter form a closure for the cut-out portion of the movable sections, whereby the sections 90, 91, form a substantially tubular bar guide with a lengthwise extending slot 92, see Figures 16, 18 and 19. The sections 90 are fixedly mounted so that the slots 92 are arranged in register with the slots 70 in the bar guides 69, 68, of the forward and breech sections of the machine.

Figure 19:
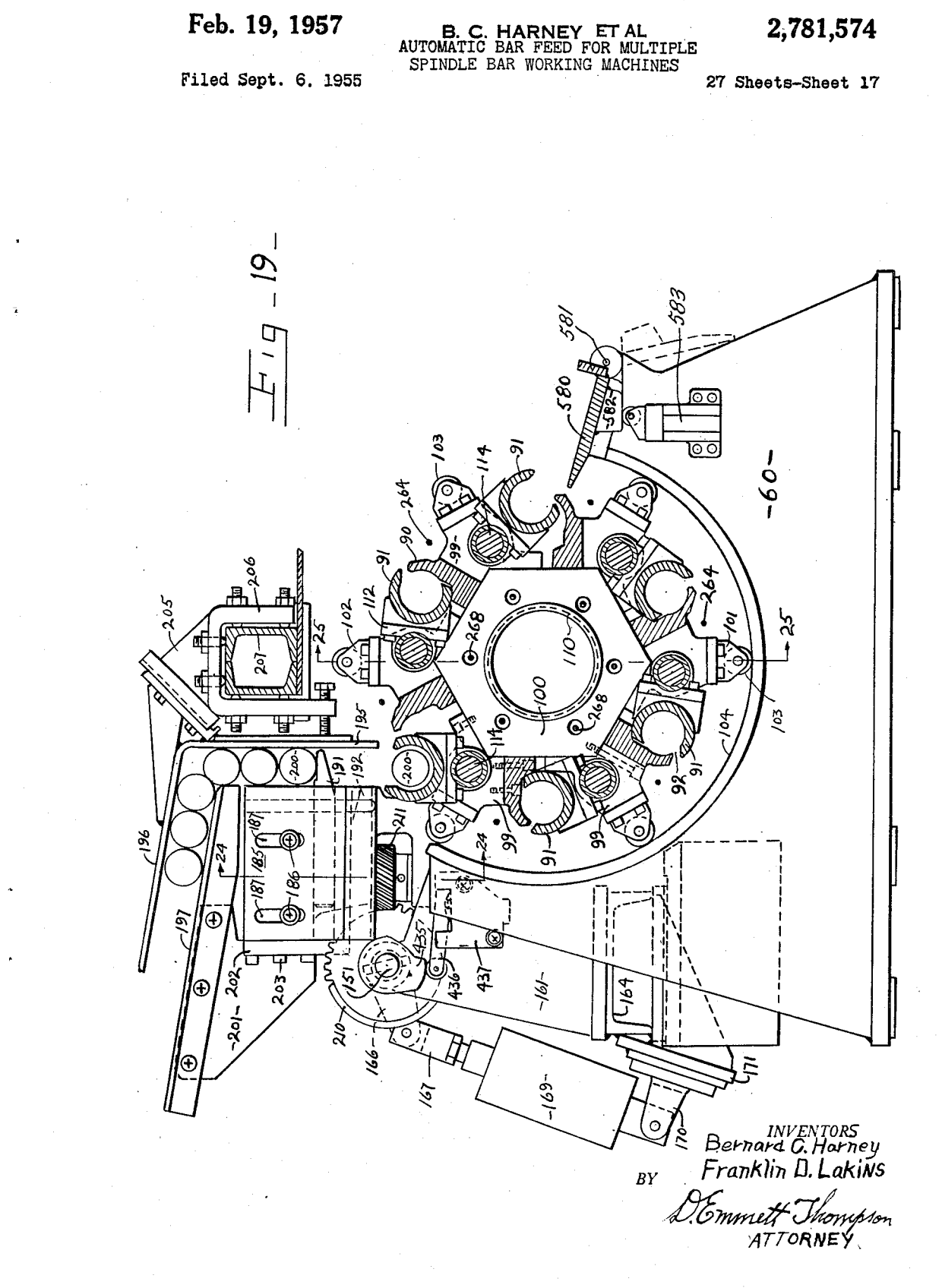

The rear ends of the fixed sections 90 are mounted in a spider member 98, see Figures 16 and 17, these sections extending forwardly and being mounted on blocks 99 secured to hexagonal members 100, see Figure 19. There is a hexagonal member 100 positioned in each of the steady rests 60, 61, and the blocks 99 have secured thereto, by screws 101, brackets 102 in which rollers 103 are journalled, these rollers being arranged to engage and ride upon the arcuate bore or surface 104 of the steady rests 60, 61.

The disks 74, 77, 88, and the hexagonal members 100 are all fixedly mounted on, and secured to, a large tubular structure 110 extending lengthwise in the center of the circular series of bar guides. This structure 110 is made up in various sections bolted, or otherwise fixedly secured to the various disks and the hex members to form a solid central connection between the disks and the hex members to support the same, and the bar guides carried thereby, in axial alinement and registration.

The movable sections 91 have fixedly secured thereto a number of brackets 112. The brackets 112 are secured at spaced intervals along the guide sections 91, as by screws 113, see Figures 19 and 25. All of the brackets secured to one of the sections 91 are fixed to a shaft 114, as by pins 115. The shafts 114 are journalled in the blocks 99. The shafts 114 are also journalled in the spider 98. With this arrangement when the shafts 114 are oscillated, the movable sections 91 are moved from the closed position as shown, for example, in Figure 16, to the open position as illustrated immediately below the bar magazine in Figure 19 and at the right hand portion of Figure 19.

Figure 18:
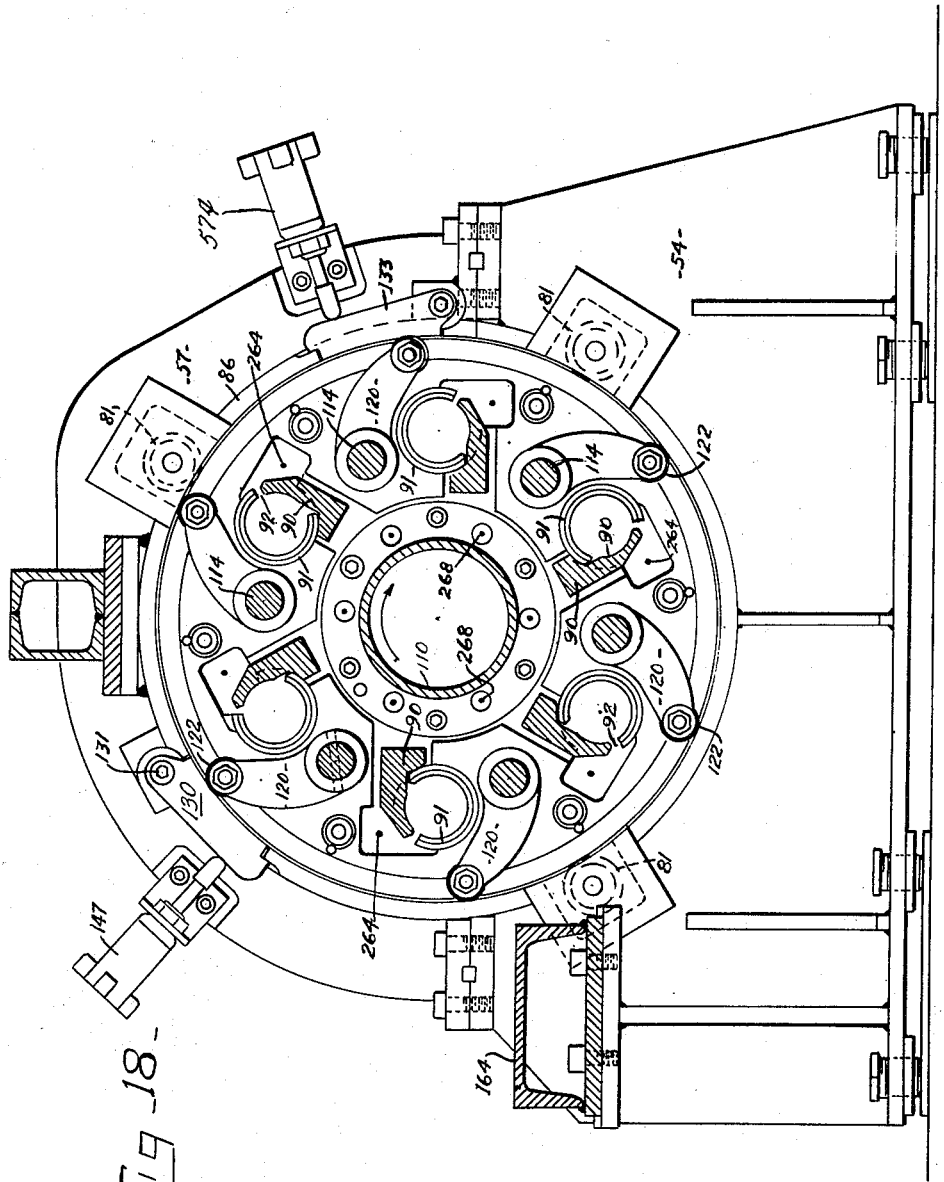
Figure 18 is a sectional view at the front end of the machine indicated by the line 18—18, Figure 1.

The movable sections 91 are maintained in closed position by arms 120 fixedly secured to the ends of the shafts 114, see Figures 16, 17 and 18. These arms carry, at their outer ends, laterally extending cylindrical portions 121 in which rollers 122 are journalled. These rollers normally engage and travel about the bore in the steady rests 54, 56, see Figures 16, 17, 18 and 21. The cap portion 59 of steady rest 56 has a portion of its arcuate surface removed, and a gate member 124 is arranged in lieu of the removed section. This gate 124 is pivotally mounted at 125 and when closed, as shown in Figure 16, forms a continuation of the arcuate surface of cap 59. The cap 57 of the forward steady rest 54 is likewise provided with a gate 130 pivoted at 131. The cap member 59 is also provided with another similar gate 132, and the cap member 57 provided with a complementally arranged gate 133. The function of the gates 132, 133, will be referred to hereinafter.

There is mounted on the steady rest 56 a bracket 135 which supports a block 136, see Figures 15 and 16. The block 136 is formed on its side, facing toward the breech section of the machine, with a recess in which there is slidably mounted a cam bar 137 and which has secured to it a rack 138. The inner portion of the cam 137 is formed, on its forward side, with an inclined cam slot 140.

There is affixed to the rear end of each of the shafts 114, a second arm 142, each of which carries a roller 143 arranged to enter the open end of the cam slot 140, if a cam bar 137 is moved inwardly during the dwell of the bar guides between indexing movements thereof. As the cam bar 137 is moved inwardly, the cam slot 140 causes the arm 142, Figure 16, to move downwardly, causing a clockwise rotation of the shaft 114 to effect movement of the section 91 of the guide away from the fixed section 90, whereby that bar guide is open to receive a stock bar. During this operation, the arm 120, attached to the shaft, is also moved in a clockwise direction. This movement is prevented unless the gate 124 is open. The gates 124, 130, are normally held shut by plungers 146 carried by the piston rods of fluid actuated cylinders 147 fixedly mounted on the radial flange 148 of the cap member 59 and the radial flange of the cap member 57, see Figures 16 and 18. As will be explained hereinafter, when the stock bar in a guide tube has been used up, pressure is relieved from the cylinders 147, permitting the gates 124, 130, to move about their pivots 125, 131, to permit movement of the arms 120 by actuation of the cam 137, as described above.

The cam bar 137 is actuated by a gear quadrant 150 meshing with the rack 138, the quadrant being mounted on the end of a shaft 151 extending along the rear side of the machine. The shaft 151 is journalled at its rear end in a bearing block 154 mounted on the top edge of the block 136. There are a number of bar loading heads, designated generally 160, mounted along the rear side of the machine, see Figures 1 and 2. Each of these loading heads is supported by a pair of plates 161, 162 extending upwardly from a base plate 163, mounted on a channel beam 164 extending forwardly from the steady rest 56 to the steady rest 54, see Figures 1, 2 and 22. The plates 161, 162, carry bearing members 165 in which the shaft 151 is journalled. A pair of arms 166 are fixed to the shaft 151 and are connected to clevis members 167, Figure 22, carried on the outer end of piston rods 168 of fluid actuated cylinders 169, the lower ends of which are pivotally mounted to brackets 170 mounted on plates 171 secured to the outer side of the channel member 164, see Figures 1, 2, 15 and 22. The cylinders 169 function to effect oscillation of the shaft 151 for operation of the cam bar 137 and other parts of the bar loading mechanism.

Figure 22:
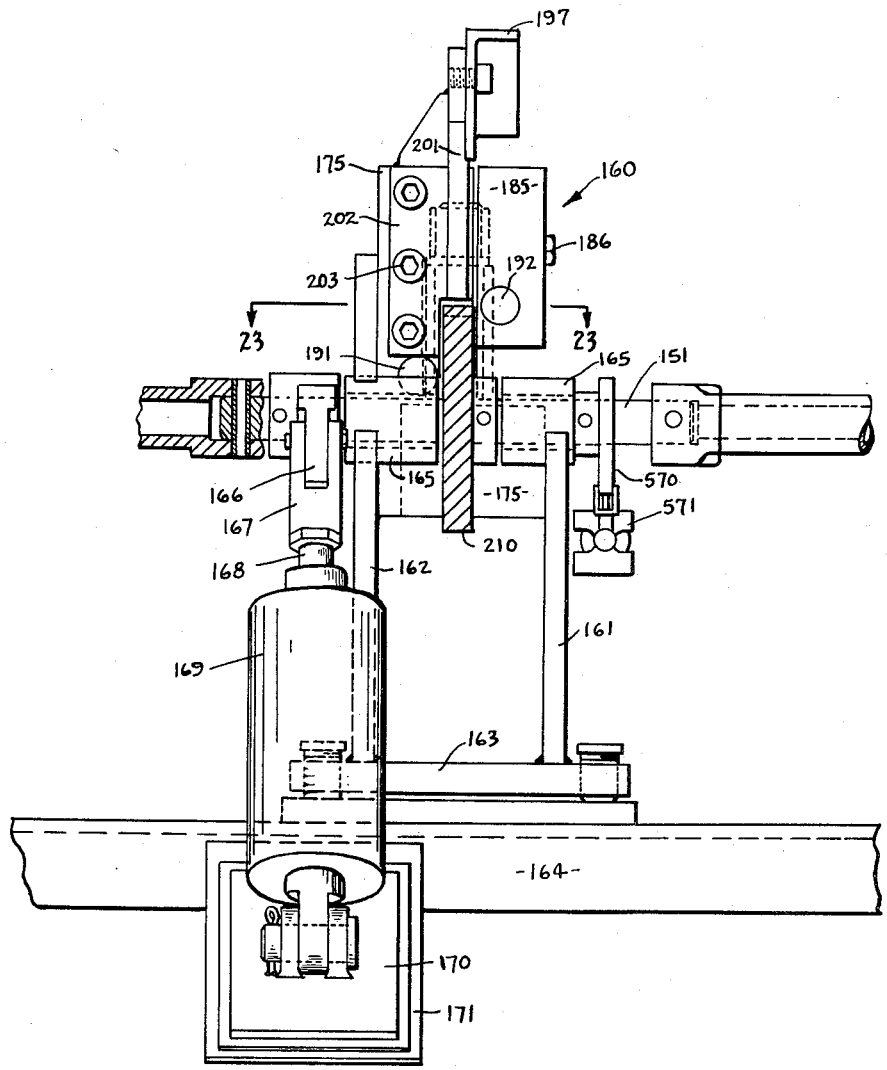
Figure 22 is a side elevational view of one of the stock bar loading heads, the view being indicated by line 22—22, Figure 3.
Figure 23:
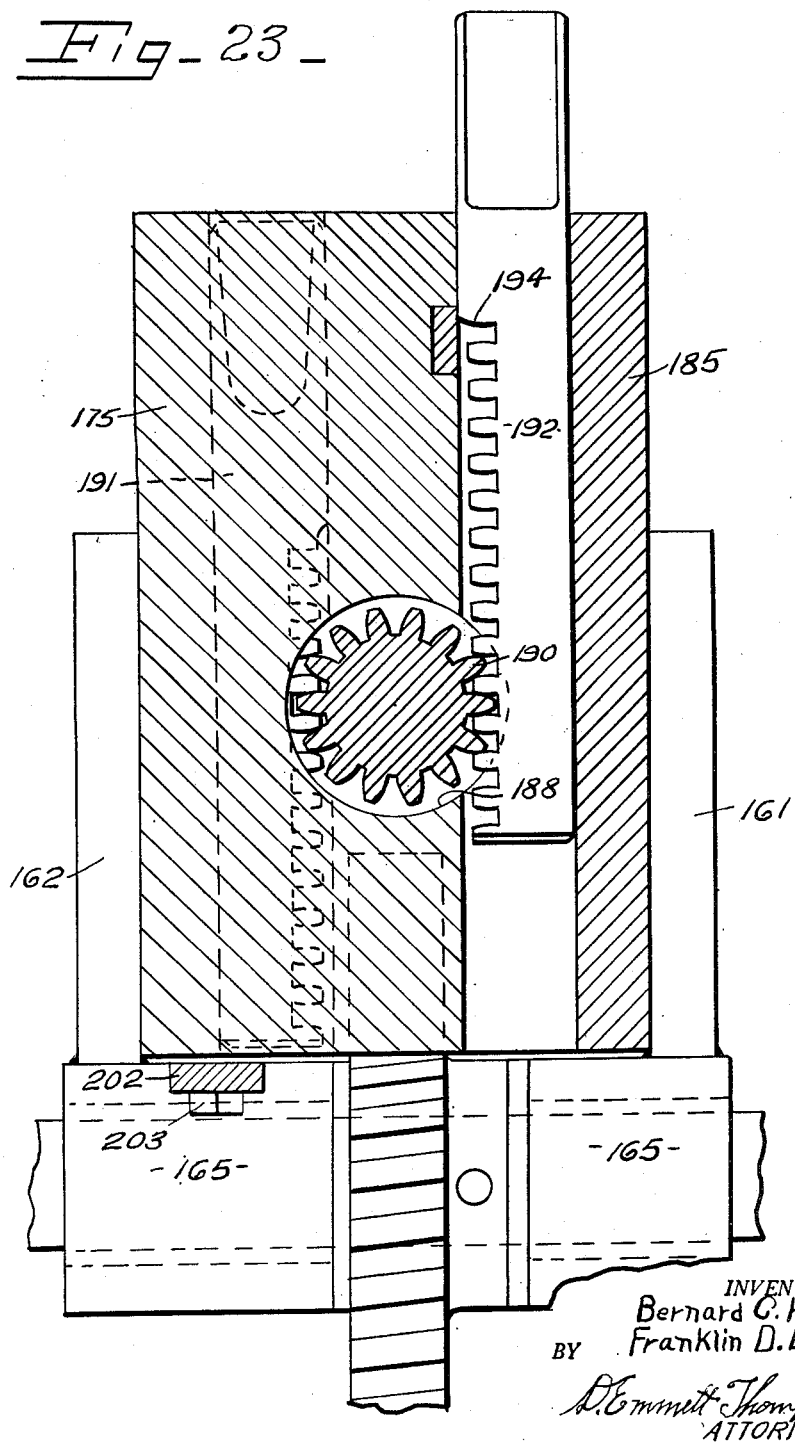
Figure 23 is a sectional view of a bar loading head taken on line 23—23, Figure 22.
Figure 24:
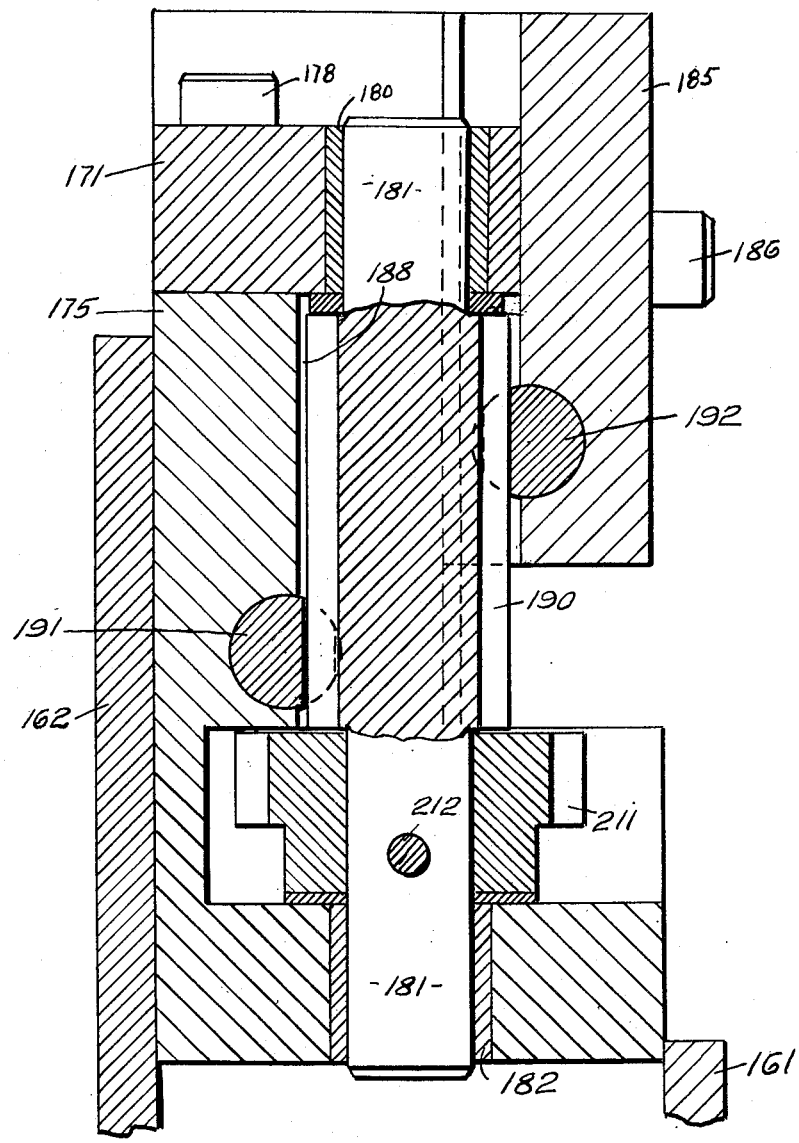
Figure 24 is a vertical sectional view of a bar loading head taken on line 24—24, Figure 19.

A block 175 is welded between the upper ends of the plates 161, 162, Figures 22, 23 and 24. A bearing block 177 is mounted on the upper end of the block 175, as by screws 178. The bearing member 177 is bored to receive a bushing 180 which serves as the upper bearing for a shaft 181, the lower end of which is journalled in a bushing 182 mounted in the lower portion of block 175 which is of sufficient lateral width to fill the space between the plates 161, 162. A movable block 185 is secured to the side of the block 175, as by screws 186, these screws extending through vertically extending slots 187, Figure 19, formed in the block 185, whereby the block 185 may be adjusted vertically relative to the block 175. The block 175 is formed with a vertically extending bore 188 which partially breaks through into the confronting side of the movable block 185, see Figure 23. The intermediate portion of shaft 181 is formed with gear teeth 190 to provide an elongated vertically disposed pinion. The block 175 is also formed with a transversely extending bore in which there is slidably mounted a feed finger 191 having one side formed with gear teeth meshing with the pinion 190, see Figures 23 and 24. The block 185 is also formed with a transverse bore in which is slidably mounted a second finger 192 likewise formed to provide a gear rack 194 meshing with the opposite side of the pinion 190. With this arrangement, rotation of the pinion 190 in a clockwise direction, Figure 23, will cause the finger 192 to move downwardly in that view, outwardly in Figure 19, and cause the finger 191 to move in the opposite direction. The fingers 191, 192, are positioned to have their inner ends extend into a vertical chute, the inner wall of which is defined by the lower leg 195 of an angle bracket, the upper leg 196 of which extends towards the rear side of the machine, and these legs 196 form, in conjunction with angle bars 197, a magazine in which a multiplicity of stock bars 200 may be positioned, see Figure 19.

The bar support pieces 197 are mounted on brackets 201 having portions 202 detachably secured to the blocks 175, as by screws 203, see Figures 19 and 22.

The angle pieces 195, 196, are bolted to angle brackets 205 having a U-shaped portion 206 positioned on a square tubular beam 207 secured at its ends to the steady rests 56, 57, and extending lengthwise at the top of the machine.

A gear 210 is fixedly secured to the shaft 151 intermediate the bearing sleeves 165. This gear is arranged in mesh with a gear 211 fixed to the lower end of the pinion shaft 181, as by pin 212, see Figures 19 and 24. With this arrangement, upon oscillation of the shaft 151 by the cylinder structures 169, the movable sections 91 of the bar guides are actuated to open and closed positions and simultaneously, the fingers 191, 192, are actuated to discharge the lowermost bar 200 in the magazine to the opened bar guide, as shown in Figure 19, in which figure, the upper pin 191 has been moved inwardly to support the bars in the magazine, and the lower pin 192 has been withdrawn to permit the lowermost bar to drop into the then open bar guide. Oscillation of the shaft 151 in the opposite direction causes the movable section 91 of the tube to move in a clockwise direction, Figure 19, to effect closing of the bar guide, and to move the finger 192 inwardly and to withdraw the upper finger 191, permitting the bars to drop downwardly onto the lower finger. In the next loading operation, the shaft 151 will be rotated in the opposite direction and the inner tapered end portion of the finger 191, being moved into the magazine, will separate the lowermost bar from the next bar above to permit repetition of the loading operation.

As perhaps best shown in Figure 21, the central supporting tube 110 of the bar guide assembly is provided at its forward end with a flange 220 which is alined with a disk 221 carried by a coupling flange 222 by means of dowel pins 224, and is fixedly attached to the coupling 222 by a number of cap screws 226. The coupling structure is fixedly mounted on the rear end of a shaft 227 on which is mounted the spindle carrier of the automatic bar working machine. This arrangement positions the bar guide in registration respectively with the work spindles 230 of the automatic bar working machine, one of which is shown in Figure 21, and provides means whereby, when the carrier of the machine is indexed, the circular series of bar guides is also indexed.

It will be apparent that the bar feed structure is of appreciable length, the intermediate section of the bar guide assembly being of sufficient length to accommodate stock bars which vary from 12 to 20 feet in length. Accordingly, due to the great length and mass of the bar guide assembly, there is considerable weight, especially when the bar guides are filled with stock bars of large diameter, to rapidly index from one station to the next. In order to relieve the automatic bar working machine of excessive strain, the bar feed structure includes an assist motor to aid in indexing the bar guide assembly. The motor is indicated at 232, Figure 10, the motor being mounted upon an angle bracket 233 secured to the rear steady rest 55. The output shaft of the motor carries a pinion gear 236 arranged in mesh with a ring gear 237 fixedly secured to the cylindrical portion 78 carried by the rear bar guide disk 74. This motor is energized, as will be hereinafter explained, just prior to the indexing of the automatic bar working machine and furnishes torque at the rear end of the bar feed for the indexing operation. Due to the great weight and mass of the bar guide assembly, it develops considerable momentum during the indexing movement, and brake means is provided at the rear and forward ends of the bar feed.

Referring to Figure 11, the outer surface of the cylindrical portion 78 is encircled by a brake band 240, one end of which is secured to a bracket 241 and the opposite end is connected to a lever 242 pivotally mounted on a bracket 243, as at 244, the opposite end of the lever being pivotally connected to a piston rod 245 of a cylinder 246 carried by a plate 247 to which the bracket 243 is affixed and the plate being affixed to the steady rest 55. The cylindrical portion 86 of the forward disk 85, see Figure 21, is also encircled by a brake band 250 having one end affixed to a bracket 251 carried by the front steady rest 54, see Figure 20, and the opposite end to a link 252 actuated by a piston and cylinder structure 253, the arrangement being substantially the same as at the rear end of the machine. Just prior to the completion of the indexing movement, the cylinders 253 are supplied with fluid pressure to effect contraction of the brake bands, as will be apparent.

The stock bars are moved or fed forwardly through the bar guides and into the spindles 230 of the bar working machine by power operated means carried by the bar guide assembly. There is mounted in each bar guide, a bar pusher best shown in Figures 27 and 28. The pusher includes a rear cylindrical portion 260 to which is fixedly secured a plate 261 which, in turn, is secured to a member 262 fixedly secured to a run 264 of a flexible strand, such as a cable, this cable being trained over an idler sheave 265 mounted at the forward end of the forward section 69 of each bar guide. The cable is also trained about a drum 267, Figures 10 and 12, arranged in juxtaposition to the rear ends of the breech section 68 of the bar guides, the other or return run of the cable being indicated at 268.

Each of the drums 267 is mounted on the output shaft 270 of a motor 271, Figures 5, 10 and 12. This motor is fixedly mounted to a plate 272. A spur gear 273 is fixed to the motor shaft 270 and is arranged in mesh with an idler gear 274 journalled on a stem 275 also carried by the plate 272. The gear 274 is arranged in mesh with a gear 277 fixedly secured to the shaft 278 of a hydraulic pump 279 also carried by the plate 272, as by means of cap screws 280, Figure 12. The inlet and outlet of the pumps 279 are connected to a closed circuit including a cylinder 281, conduit 282, and throttle valve 283, see Figures 5, 12 and 13. The pump functions as a governor to control the speed of the motor 271, the motor effecting operation of the pump through the gear train 273, 274, 277, and the speed of the pump being controlled by the adjustment of the throttle valve member 283, the pump accordingly acting as a brake through the gear train to maintain the motors 271 at a uniform speed regardless of the load applied to the motors. The purpose of the cylinder 281 is to make certain that the closed pump circuit is completely filled with oil, or other fluid. The circuit is initially filled by removing the cap 285 in which is slidably mounted a hollow stem 286 carrying a piston 287. The cylinder and the circuit are filled and the piston applied to the open end of the cylinder. As the piston is moved into the cylinder, the oil escapes through the hollow stem 286. The piston is moved inwardly until the cap 285 can be threaded onto the cylinder, and a plug 289 is then threaded into the outer end of the stem 286. This operation has permitted the escape of all air, and the piston 287 is urged against the fluid in the system by spring 290. The cylinders 281 are provided with threaded stems 291 mounted in an apertured ear portion 292 of the plate 272, the assembly being secured by jam nuts 294, see Figures 10 and 12. Each of the motor supporting plates 272 is mounted upon a bracket 295 extending rearwardly from, and normal to, the rear guide supporting disk 74. The brackets 295 have base plates 296 attached to the disk 74, as by screws 297, see Figures 5, 6, 10 and 12. The bracket 295 is formed with a lengthwise extending slot 298, the inner end of which terminates at 299. A block 300 is slidably mounted in the slot and is fixed to the plate 272, as by screws 301, and has a boss 302 extending outwardly from the opposite side of the bracket 295, see Figure 12. An adjusting screw 304 is threaded into the boss 302 and engages the base plate 296 of the bracket. The purpose of the screw 305 is to effect movement of the plate 272, and the motor 271 carried thereby, toward and from the disk 74 and to provide for proper positioning of the motors 271, and also providing a means of tensioning the cable 264, 268, which is wrapped a plurality of times about the drum 267. The plate 272 is fixedly secured in adjusted position by cap screws 306 extending through elongated apertures in the plate and threading into the bracket 295.

Making reference again to Figure 27, a rod 310 is fixedly secured in the cylindrical member 260 and is threaded at its free end to receive a rod 311 formed at its forward end with an enlarged shouldered portion 312 slidably positioned in a sleeve 314 having an end wall 315 formed with an aperture to slidably receive the rod 311. A center piece 316 is threaded into the outer end of the sleeve 314 and is formed with an axial bore to slidably receive an ejector rod 317. The inner end of the ejector rod is formed with an enlarged collar portion 318 which is tapped to receive a screw 319 on which is mounted a spacer 320. A thrust bearing 321 is mounted on the spacer 320 intermediate the head portion 313 of the ejector rod, and the end of a cup-shaped member 322, the cylindrical portion of which encircles the portion 312 of rod 311 and is fixedly secured thereto, as by pin 324. The rod 311 is fixedly secured to the rod 310 by a jam nut 325, and a helical compression spring 326 is mounted on the rod 311 between the nut 325 and a thrust bearing 327 which functions to move the sleeve 314 forwardly so that the end wall portion 315 thereof engages the collar portion 312 on rod 311.

The outer end of the center piece 316 is formed with a conical bore 328 for engaging the rear end of the stock bar. With this arrangement, when the pusher has been advanced forwardly through the bar guide and through the spindle of the bar working machine into engagement with the rear end of the machine collet, further forward movement of the rods 310, 311, result in the compression of spring 326 and the movement of the ejector pin 317 forwardly through the center piece 316 to eject the remnant of the bar through the collet.

The member 262 is formed at one end with a bore 330 of relatively short length to receive the cable 264. The member 262 is formed with a relatively large bore extending inwardly from the opposite end and in which is positioned a cable grip member 331 secured in the bore by a plug 332 threaded into the member 262 and secured, as by set screw 333. As previously explained, the member 262 is connected to the cylindrical portion 260 of the pusher by a plate 261 extending through the slot extending lengthwise in the bar guide.

It will be understood that in the operation of automatic bar working machines, the work holding collets are opened, the stock bar is fed forward against a stop member, the collet is closed and the work piece rotated while the tooling performs the operation on the stock bar to form the work piece which, after formation, is cut off from the bar, the collet is opened and the bar fed forwardly for repetition of the operation.

In our stock bar feed apparatus, when the pusher has been advanced forwardly by its motor 271 so that the center piece 316 is at the collet in the spindle of the bar working machine—that is, when the stock bar in the stock bar guide has become used up, or exhausted, the cable grip member 262 engages a disk 340. This disk is fixedly secured to a rod 341 slidably mounted in a sleeve 342 carried by a disk 343. The rear end of the rod 341, see Figure 29, has an enlarged head portion 344 formed on its periphery with axially spaced apart grooves 345. The enlarged head portion of sleeve 342 is provided with a spring-pressed poppet 348 for engagement with the grooves 345 to yieldingly hold the rod 341 in shifted position. The enlarged portion 344 of the rod 341 is tapped to receive the threaded end of a rod 349, the two rods being fixedly secured together in adjusted position by a jam nut 350.

The rod 349 extends rearwardly and is slidably mounted in the front guide supporting disk 85 and has affixed to it a block 351. This block is formed with a leg portion 352 having an inclined cam surface 353, see Figure 30, and a leg portion 354. When the cable grip member 262 engages the disk 340 and moves the rods 341, 349 forwardly, the leg portion 354 of the block 351 is positioned in registration with the actuating member 356 of a valve 357 fixedly mounted on a supporting bracket 358 carried by the front steady rest 54, and when the bar guide assembly is indexed to move the block 351 past the valve 357, the valve is accordingly actuated. The valve 357 is located on the front steady rest, see Figure 20, to be actuated at station 4.

The purpose of the cam surface 353 on the leg portion 352 of block 351 is to effect inward movement of the block and the rods 341, 349. This is brought about by the cam surface being engaged by a roller 360 mounted on a bracket 361 fixedly secured to the valve 357, as by screws 362, which also secure the valve to the bracket 358. The valve 357, when actuated, functions to effect a reversal of the motors 271 to return the stock pusher into the breech section of the bar feed structure.

It will be observed that the bar pusher, Figure 27, has to be of sufficient length to extend through the work holding spindle of the bar working machine, and in order to load a new bar in a bar guide in the intermediate section of the feed structure, it is necessary to move the bar pusher rearwardly into the breech section and accordingly, the tubes 68 in the breech section must be of sufficient length to accommodate the stock bar pusher.

As previously explained, the feed motors 271 may be individually adjusted lengthwise of the machine for tensioning the bar pusher actuating cable. The tension on the cable may also be adjusted by the arrangement shown in Figures 21 and 26. The sheaves 265 are journalled in the bifurcated end portion of a bar 370. This bar is slidably mounted for movement axially of the tube 69 on a bar 371 welded or fixedly secured to the tubes. The bars 370 are formed with a lengthwise extending slot 373 to receive clamping screws 374. The bar 370 is provided at its rear or inner end with a bore 375 in which there is mounted a plunger 376. This plunger is slidably mounted on a threaded stem 377 fixedly secured in the tube flange 378, as by set screw 379. A spring 380 is interposed between the plunger 376 and the bottom wall of the bore 375. A nut 381 is threaded upon the stem 377 to urge the plunger 376 to the left, Figure 26, effecting compression of the spring 380 which urges the bar 370 forward to tension the cable. The plunger 376 may be formed on its periphery with lines 382 to indicate the amount of pressure exerted on the bar 370, or the amount of tension put on the cable. The bar 370 is locked in adjusted position by the screws 374 threading into the bar 371.

Figure 20:
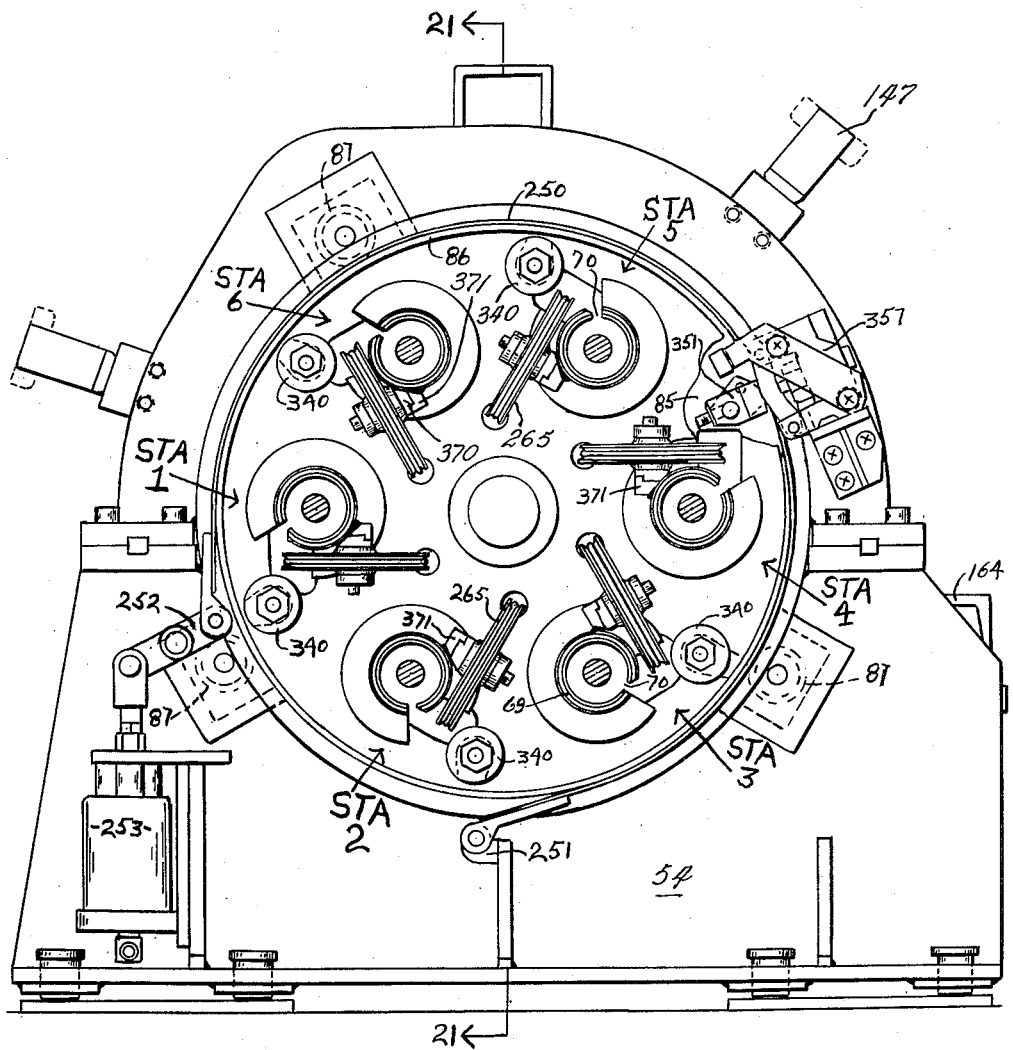
Figure 20 is a front end elevational view of the bar feed structure.

As previously stated, when a stock bar has become exhausted in a bar guide, the actuating member 351 for valve 357 has been moved into actuating position. The bar guide assembly is indexed about the axis of the tubular member 110 in a clockwise direction looking at the rear end of the machine, Figure 6, and in a counterclockwise direction looking at the front end of the machine, Figure 20, the bar guides being indexed to and past six stations. The stations are indicated in Figures 6 and 20 by the notations "Sta. 1," "Sta. 2," etc. It will be observed, referring to Figure 20, that the valve 357 is located in juxtaposition to station 4. Accordingly, after the actuating block 351 has been moved to valve actuating position, as shown in Figure 29, the valve 357 will be actuated when the bar guide associated with that actuating block arrives at station 4.

When actuated, the valve 357 supplies air to a cylinder 390 carried by the bracket 391 fixed secured to the cap portion 58 of steady rest 55, see Figures 6 and 8. The piston rod 392 of cylinder 390 is moved downwardly and engages the actuating member 393 of a valve 394. This valve and a valve 395 are fixedly secured to the rear disk 74 by screws 396, and the pair of valves 394, 395, are positioned on the disk approximately one and one-half stations forward, in the direction of indexing, of the bar guide with which the valves are associated. It is to be also kept in mind that there are a pair of the valves 394, 395, associated with each bar guide. In Figure 6, there is another pair of these valves shown in the lower right-hand corner of this figure, positioned intermediate stations 1 and 2. However, the other four pairs of these valves are omitted from this figure in the interest of clarity. In other words, inasmuch as the pairs of valves 394, 395, are equally spaced about the disk 74, there is always a pair of these valves positioned in registration with the cylinder 390 during the dwell of the machine, whereupon the valve 394 may be actuated by the stem 392 if the stem is moved inwardly.

When the valve 394 is actuated, it furnishes fluid pressure through a conduit 400, see schematic diagram Figure 31, to the motor 271 associated with the bar guide now positioned at station 4. This effects reversal of the motor to return the stock pusher to the breech section of that bar guide, and when the stock pusher thus completes its return movement, it engages and cams outwardly a plunger 401. The plungers 401 are slidably mounted in a cylinder 402, each of which has a base plate 403 for attaching the cylinders to the rear disk 74, as by means of screws 404, see Figures 5, 6, 10 and 14. The cylinders 402 are formed, throughout the major portion of their length, with an enlarged bore 405, the outer end of which is closed by a plug 406. A compression spring 407 is mounted on the plunger 401 intermediate the plug 406 and a collar 408 which is fixedly secured to the plunger, the spring acting to urge the plungers inwardly toward the axis of the frame tube 110. The rear end portion of each of the breech tubes 68, extending outwardly from the disk 74, is provided with an aperture 410 in registration with the inner end of the plunger 401 which is provided with a roller 411, see Figure 14, which is engaged by the portion 260 of the bar pusher when it is fully returned, as shown in Figure 10. This effects outward movement of the plunger 401 and the plunger is maintained in this outward position until the bar pusher is again moved forwardly.

A cap 412 is secured to the rear end of each of the tube sections 68, as by screws 413. This cap is provided on its inner surface with a rubber bumper 415 of conical formation for engagement by a conical bore in the rear end of the pusher member 260.

As the bar guide, under discussion, is indexed from station 4 to station 5, the plunger 401 actuates a valve 416, see Figure 6, mounted on a bracket 417 which is fixedly secured to the steady rest cap 58. The valve 416 functions, when so actuated, to exhaust one side of a control valve 418, see Figure 31, supplied with fluid pressure through a conduit 420 connected to the main supply valve 421. Exhausting the pressure from the left side of the valve 418, results in pressure being relieved from the conduit 422 extending to the cylinders 147 and thereby relieving the pressure on said cylinders. The cylinders 147, see Figures 16 and 18 function, when pressurized, to hold the gates 124, 130, in closed position to prevent opening of the intermediate section of the bar guides, as previously explained. The control valve 418 will remain in its actuated condition until it is exhausted on the right side, Figure 31.

When the bar guide, under discussion, has been indexed to station 5, its plunger 401 actuates a valve 430, similar to the valve 416, mounted on a bracket 431 also fixedly secured to the cap 58 of the rear steady rest, see Figure 6, and the valve mounting being better illustrated in Figure 9. The valve 430 is supplied with fluid pressure through conduit 432 extending from the control valve 418. The valve applies pressure through conduit 434 to the upper ends of the cylinders 169 which function to effect oscillation of the shaft 151, Figures 15 and 22. As previously explained, oscillation of the shaft 151 functions to effect movement of the movable section 91 of the bar guide to open position, as shown in Figure 19, and this occurring at station 5 and simultaneously actuating the fingers 191, 192, to deposit a bar from the magazine into the open tube, this being permissible in view of the fact that the stock bar pusher is now positioned in the breech section 68 of the bar guide. It will be observed that this opening of the bar tube at station 5, and the loading of a new bar in the tube, can not occur unless the bar pusher is completely returned in the breech section of the machine.

When the movable section 91 reaches full open position, as shown in Figure 19, a cam 435 fixed to the shaft 151 engages an actuator 436 to open a valve 437 which exhausts the right-hand side of the pilot section of control valve 418. The control valve then applies air to the bottom of the cylinders 169 to oscillate the shaft 151 in the opposite direction to move the movable section 91 of the bar guide to closed position and effect actuation of the fingers 191, 192, to position the lowermost bar in the magazine on the lower finger 192 preparatory to the next loading operation. This operation of the control valve 418 also applies pressure to the cylinders 147 to lock the gates 124—130 closed. All of this bar loading operation takes place at station 5.

As the bar guide assembly is indexed from station 5 to station 6, the extended plunger 401 actuates a valve 450 which is a three-way valve normally exhausting pressure from the pressure operated switch 452. The valve 450 is supplied with pressure from the line 453 and when actuated, applies pressure through the line 454 to the switch 452 to complete a circuit through wire 456, Figures 31 and 32, switch 452, wire 457, relay coil 458, wire 459, which is the common side of the source. The automatic bar working machine has a cam shaft 460 which makes one revolution during the interval between indexing movements of the bar feed. The cam shaft 460 carries cams 462, 463, 464, 465, 466. These cams are arranged to actuate respectively switches 472, 473, 474, 475, 476. The hot side of the line 456 is connected to the movable contact of each of the switches 472–476. Relay coil 458, when energized, closes contacts 477, 478. The contact 477 engages a fixed contact 479 connected to a fixed contact 480 on switch 474 which is normally engaged by the movable contact 481 connected to the hot side 456. The movable contact 477 of relay 458 is connected to the wire 457. This arrangement establishes a stick circuit for the coil 458. The contact 478 of the relay engages a fixed contact 483 connected by wire 484 to the fixed contact 485 of switch 476, establishing a circuit from the hot side 456, to wire 486, to solenoid operated valve 487, wire 488, which is the common side of the line. Valve 487 is connected to the supply line 453 and through line 490 to cylinder 491 to move a plunger 492 inwardly. The cylinder 491, Figures 6 and 7, is mounted upon a bracket 493 fixed to the steady rest 55, as by screws 494. The cylinder 491 is located in the right lower portion of the back steady rest 55, as seen in Figure 6, because at this time the bar guide under discussion is located at station 6 and it will be remembered that the valves 394, 395, are located approximately one and one-half stations ahead of the bar guide with which they are associated.

The plunger 492 engages an actuator 496 slidably mounted in a projecting member 497 attached to the valve 395, whereby that valve becomes actuated. The valves 395, as well as the valves 394, are supplied with fluid pressure through lines 498 which are connected to a header 500 carried by a tube 501 extending rearwardly from the rear disk 74, see Figure 10. The header is supplied with fluid pressure by a conduit 502 through a rotating joint 503. It will be remembered that there are six pairs of the valves 394, 395, one pair being associated with each bar guide, so there are six of the conduits 498 radiating from the header 500, see Figure 5. The valve 395 is connected by a line 508 to the forward side of the motor 271 and the motor advances the bar pusher and the bar forwardly until the forward end of the bar engages the collet which, at that time, is closed because at this time at station 6, the bar working machine has commenced its machining cycle.

Cam 466 is set to open switch 476 after a sufficient time has elapsed for the new bar to reach the collet whereupon switch 476 is opened, breaking the circuit to solenoid 487 and accordingly, exhausting the air from the cylinder 491, permitting the valve 395 to close, shutting off the fluid supply to the motor 271.

After the machining cycle is completed, cams 462 and 463 close switches 472 and 473. The closing of the contacts of switch 472 re-establishes a circuit on wire 486 to again supply the motor 271 with fluid pressure for forward operation by the means just described.

The closing of the contacts of switch 473 supplies power to wire 512, solenoid valve 513, wire 488, to the common side of the line. The valve 513 is supplied from the line 514 and through line 515 supplies pressure to a valve 516. This valve is spring actuated in one direction and operated in the opposite direction by a solenoid 517. In normal position, the valve 516 supplies air to the motor 232 to assist the indexing of the bar guide assembly, as previously explained.

Immediately following this situation, the collet of the bar working machine opens, permitting the energized motor 271 to feed the bar forwardly against the bar stop and immediately thereafter, the collet of the machine closes to grip the bar for the machining operation. Immediately following this situation, cam 462 opens the contacts of switch 472, breaking the circuit to wire 486, which results in shutting off the supply pressure to the feed motor 271, as explained. At that time, the bar working machine indexes and it is assisted in indexing the bar feed structure by the assist motor 232 which is energized, as explained.

Previous to the completion of this indexing movement, cam 465 actuates the switch 475 which, through wire 520, provides a hot feed to relay coil 521, wire 522, to wire 459, the common side of the circuit. Wire 520 supplies power to the stationary contact 524 of coil 521 and, through the now closed contact 525, power is furnished through wire 526 to the solenoid 517 of valve 516. This effects actuation of the valve to discontinue the supply of fluid to the assist motor 232 and furnishes fluid under pressure through line 530 to the brake cylinders 246, 253, to apply braking force to the bar guide assembly to overcome the momentum thereof prior to the guide reaching station 1.

The bar feed structure includes features to prevent indexing of the bar guide assembly if any of the parts thereof are not properly positioned. Referring to Figure 22, a cam 570 is fixed on the shaft 151 and is engaged to actuate an air valve 571. The cam 570 is adjusted so that the valve 571 is opened immediately upon movement of the sections 91 away from the sections 90, and remains open until the sections 91 are returned to closed position, as shown in Figure 18.

In addition to the movable sections 91 being moved toward and from open position by the oscillation of shaft 151, the tubes may be opened manually at station 1. As previously explained in connection with Figures 16 and 18, the arcuate sections 59, 86, of the top caps of the steady rests 54 and 56 are provided with additional openings and gates 132—133. These gates are normally held closed by cylinders 574, the gates 132, 133 being arranged, when opened, to permit movement of the guide sections 91 at station 1. The cylinders 574 are exhausted by closing the main air valve 421. The movable guide section 91 of the guide at station 1 may be then moved manually, the arms 120 on the shafts 114 moving outwardly through the gate openings. One of the cylinders 574, as the cylinder mounted upon the steady rest 56, Figure 16, has its plunger 575 provided with a bracket 576 positioned when the plunger is moved outwardly by its spring, to open a valve 577.

In order to permit convenient removal of the bar from the manually open guide at station 1, a shelf 580 is pivotally mounted on the frame, as at 581, and extends lengthwise of the bar guides. This shelf is swung inwardly about its pivot to the position shown in Figure 19. In this position, when the bar guide is open, the bar therein will drop onto the shelf 580 from which it may be conveniently removed. This shelf 580 is normally in the position shown in dotted outline, Figure 19. When it is moved into the full line position as shown, a boss 582 on the under side of the shelf actuates a valve 583 fixed to the steady rest 60. The valves 571, 577 and 583 are all supplied with pressure from the line 420. The valve 571 is connected to the line 585 through line 586, the valve 577 through the line 587, and the valve 583 through line 588. The line 585 extends to a pressure operated switch 590, through supply line 514. Pressure switches 592, 593, are supplied with pressure by lines 420, 514, respectively. The contacts of switches 592, 593 are normally closed and are held open by the applied pressure to the switch. The contacts of switch 590 are normally open and are held closed by pressure from line 585. These switches are all connected in parallel to the wire 456 which is the hot side of the line previously referred to, and if the contacts of any one of the three switches 591, 592, 593 are closed, current is supplied through wire 595 to the lower contacts of switch 474. These contacts, designated 596, 597, are closed when the switch is actuated by cam 464 which occurs just ahead of the indexing movement. This completes a circuit through wire 598 to relay coil 600, to wire 459, to the common side of the circuit. The relay 600 has a normally closed contact 601 which, in closed condition, completes a circuit to the main motor starter of the bar working machine. Accordingly, when the coil 600 is energized, the contacts 601 are opened, stopping the bar machine. Accordingly, there can be no indexing of the bar guide assembly if the shelf 580 is in bar receiving position, as shown in Figure 19, or if a bar guide section 91 has been manually moved to open position at station 1, or if the gates 132, 133, are in open position, or the automatic bar loading mechanism has failed to close. Also, the machine can not be indexed if there is a failure of fluid pressure to the system which, as explained, will effect closing of the contacts of the switches 592, 593.

Actuation of the switch 474 by cam 464 opens the contacts 481, 480, breaking the stick circuit to the relay 458 which, as previously explained, completes a signal circuit indicating the presence of a new bar loaded into the tube. After a bar has been placed in the bar guide, the feeding of the bar at each indexing movement is taken care of by operation of switch 472.

From the above, it will be apparent that our bar feed functions to automatically and continuously supply the bar working machine with stock bars. If a supply of bars is maintained in the stock bar magazine, the operation is entirely automatic and continuous—not requiring any stoppage of the bar working machine for the insertion of a stock bar in one of the bar guides. This obviously results in greatly increasing the productive output of the bar working machine.

What we claim is:

1. An automatic stock bar feed structure for automatic multiple spindle bar working machines having a rotatable work spindle carrier, a stock bar reel including a circular series of bar guides mounted for rotation about the axis of said carrier and being connected thereto for indexing therewith, said bar guides being arranged in alinement with the spindles respectively of the bar working machine, a stock bar pusher movable along each of said bar guides for feeding a stock bar toward said spindles, said bar pushers being of sufficient length to pass through the machine spindles to the bar gripping collets thereof, and power operated means carried by and rotatable with said reel for moving said pushers toward and through the machine spindles for the feeding of the stock bars.

2. An automatic stock bar feed structure for automatic multiple spindle bar working machines having a rotatable work spindle carrier, a stock bar reel including a circular series of bar guides mounted for rotation about the axis of said carrier and being connected thereto for indexing therewith, said bar guides being arranged in alinement with the spindles respectively of the bar working machine, a stock bar pusher movable along each of said bar guides for feeding a stock bar toward said spindles, said bar pushers being of sufficient length to pass through the machine spindles to the bar gripping collets thereof, and power operated means associated with each of said guides for moving said pushers toward and through the machine spindles for the feeding of the stock bars.

3. An automatic stock bar feed structure for automatic multiple spindle bar working machines having a rotatable work spindle carrier comprising a frame, a stock bar reel including a circular series of bar guides mounted for rotation about the axis of the machine spindle carrier and being indexible therewith, a magazine arranged adjacent said reel for supporting a supply of stock bars, power operated means for feeding stock bars from said magazine to said bar guides, a bar pusher movable along each of said bar guides and being of sufficient length to pass through the spindles of the machine to the bar gripping collets mounted therein, and power operated means carried by and rotatable with said reel for moving said pushers toward and through the machine spindles for the feeding of the stock bars.

4. An automatic stock bar feed structure for automatic multiple spindle bar working machines having a rotatable work spindle carrier comprising a frame, a stock bar reel indexible with the spindle of the machine and having a circular series of bar guides arranged in registration respectively with the spindles of the machine, each of said guides comprising a loading section and a breech section, a stock bar pusher movable along each of said bar guides and being comparable in length to the length of the spindles of the machine, the breech section of each of said guides being of sufficient length to accommodate said bar pushers, a magazine mounted in juxtaposition to said reel for supporting a supply of stock bare extending parallel to said guides, bar loading means operable during the dwell of said reel for transferring a bar from said magazine to one of said guides, and power operated means carried by and rotatable with said reel for moving said pushers toward and through the spindles of the machine for the feeding of stock bars.

5. An automatic stock bar feed structure for automatic multiple spindle bar working machines having a rotatable work spindle carrier comprising a frame, a stock bar reel having a circular series of bar guides, each of said guides being arranged in axial alinement with one of the machine spindles, said reel being connected at its forward end to the spindle carrier of the bar working machine and being indexible therewith, a bar pusher slidably mounted in each of said bar guides, said pushers being comparable in length with the spindles of the machine, each of said bar guides having a breech section and a loading section, the loading sections of said guides including a fixed portion and a portion movable from said fixed portion to open the guide for the loading of a bar therein and toward the fixed portion to close the guide, a magazine for supporting a supply of stock bars arranged parallel to said guides, means operable when an empty guide is positioned at a loading station to move said movable portion of the guide to open the same, bar loading means operable to load a new bar in the open guide and to effect closing of the loaded guide, and power means carried by and rotatable with said circular series of guides for moving said pushers toward and through the spindles of the machine for the feeding of the stock bars.

6. An automatic stock bar feed structure for automatic multiple spindle bar working machines having a rotatable work spindle carrier comprising a frame, a stock bar reel having a circular series of stock bar guides, said reel being operatively connected to the carrier of the machine with said guides arranged respectively in alinement with the spindles of the machine, each of said guides having a rear breech section and a loading section disposed forwardly of the breech section, a magazine for supporting a supply of stock bars arranged in parallel relation to said guides and having a discharge at a loading station in juxtaposition to the loading section of the guides, a stock bar pusher slidably mounted in each of said guides, an endless flexible strand trained over a pulley journalled at each end of the guide, said flexible strand being connected to said pusher and being operable to effect reciprocation thereof in the guide for the feeding of stock bars toward and through the spindles of the bar working machine, power means connected to one of said pulleys and operable, upon the exhaustion of a bar in a guide, to effect return movement of said pusher in the breech section of the guide, and bar loading means operable, subsequent to the return of said pusher in the breech section of the guide, for transferring a bar from said magazine to the guide positioned at the loading station, and means operable, subsequent to the loading of the guide, to effect reversal of said power means for feeding the bar toward and through the spindle of the machine.

7. An automatic stock bar feed structure for automatic multiple spindle bar working machines having a rotatable work spindle carrier, a stock bar reel including a circular series of bar guides mounted for rotation about the axis of said carrier and being connected thereto and indexible therewith to successively position said guides at a bar loading station, said guides being arranged in said reel in alinement with the spindles respectively of the bar working machine, a magazine at said bar loading station for supporting a supply of stock bars, means operable upon the arrival of an empty guide at said loading station to transfer a bar from said magazine to said empty guide, a stock bar pusher movable along each of said bar guides for feeding a stock bar toward and through the spindles of the bar working machine, and power operated means associated with each of said guides for moving said pushers toward and through the machine spindles for the feeding of the stock bars.

8. An automatic stock bar feed structure for automatic multiple spindle bar working machines having a rotatable work spindle carrier, a stock bar reel including a circular series of bar guides mounted for rotation about the axis of said carrier and being connected thereto and indexible therewith to successively position said guides at a bar loading station, said guides being arranged in said reel in alinement with the spindles respectively of the bar working machine, each guide having a fixed portion and a portion movable from said fixed portion to open the guide for the loading of a bar therein, and toward said fixed portion to close the guide, a stock bar pusher movable along each of said bar guides for feeding a stock bar through the spindles of the bar working machine, a magazine at said bar loading station for supporting a supply of stock bars, a cam member mounted at said loading station and operable, when actuated, to move the movable section of a bar guide positioned at said loading station to open and closed positions, a bar loading means operable to transfer a bar from said magazine to said bar guide when the same is open, power means for actuating said cam and operating said loading means upon the arrival of an empty bar guide at said loading station, and power operated means for moving said pushers forward for the feeding of the stock bars.

9. An automatic stock bar feed structure for automatic multiple spindle bar working machines having a rotatable work spindle carrier, a stock bar reel including a circular series of bar guides mounted for rotation about the axis of said carrier and being connected thereto and indexible therewith to successively position said guides at a bar loading station, said guides being arranged in said reel in alinement with the spindles respectively of the bar working machine, each of said bar guides having a loading section and a breech section, each loading section having a fixed portion and a portion movable from said fixed portion to open the guide for the loading of a bar therein, and toward said fixed portion to close the guide, a stock bar pusher movable along each of said bar guides for feeding a stock bar through the spindles of the bar working machine, a magazine at said bar loading station for supporting a supply of stock bars, a cam member mounted at said loading station and operable, when actuated, to move the movable section of a bar guide positioned at said loading station to open and closed positions, a bar loading means operable to transfer a bar from said magazine to said bar guide when the same is open, power means for actuating said cam and operating said loading means upon the arrival of an empty bar guide at said loading station, and power operated means for moving said pushers forward for the feeding of the stock bars.

10. A stock bar feed structure as defined in claim 9 and including means for preventing the operation of the bar loading means and the means for opening the guide at said loading station unless the pusher of said guide is positioned in the breech section thereof.

11. A bar feed structure as defined in claim 9 and including means operable to stop the bar working machine if the movable portion of the bar guide at said loading station is not moved to closed position subsequent to the operation of the bar loading means.

No references cited.